(12) United States Patent
Combs et al.

(10) Patent No.: US 9,329,865 B2
(45) Date of Patent: May 3, 2016

(54) CONTEXT CONTROL AND PARAMETER PASSING WITHIN MICROCODE BASED INSTRUCTION ROUTINES

(71) Applicants: Jonathan D. Combs, Austin, TX (US); Kameswar Subramaniam, Austin, TX (US); Jeffrey G. Wiedemeier, Austin, TX (US)

(72) Inventors: Jonathan D. Combs, Austin, TX (US); Kameswar Subramaniam, Austin, TX (US); Jeffrey G. Wiedemeier, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 408 days.

(21) Appl. No.: 13/915,227

(22) Filed: Jun. 11, 2013

(65) Prior Publication Data

US 2014/0365754 A1    Dec. 11, 2014

(51) Int. Cl.
  *G06F 21/74* (2013.01)
  *G06F 9/30* (2006.01)
  *G06F 9/38* (2006.01)

(52) U.S. Cl.
  CPC ........ *G06F 9/30054* (2013.01); *G06F 9/30101* (2013.01); *G06F 9/384* (2013.01)

(58) Field of Classification Search
  CPC ...................................................... G06F 21/74
  See application file for complete search history.

(56) References Cited

U.S. PATENT DOCUMENTS

| | | | |
|---|---|---|---|
| 5,410,658 A * | 4/1995 | Sawase | G06F 9/3851 712/246 |
| 5,537,629 A | 7/1996 | Brown et al. | |
| 5,559,974 A | 9/1996 | Boggs et al. | |
| 5,566,298 A | 10/1996 | Boggs et al. | |
| 5,581,717 A | 12/1996 | Boggs et al. | |
| 5,586,277 A | 12/1996 | Brown et al. | |
| 5,600,806 A | 2/1997 | Brown et al. | |
| 5,630,083 A | 5/1997 | Carbine et al. | |
| 5,668,985 A | 9/1997 | Carbine et al. | |
| 5,673,427 A | 9/1997 | Brown et al. | |
| 5,822,555 A | 10/1998 | Brown et al. | |
| 5,884,071 A | 3/1999 | Kosaraju | |
| 6,041,403 A | 3/2000 | Parker et al. | |
| 7,139,936 B2 | 11/2006 | Petsinger et al. | |
| 7,694,110 B1 | 4/2010 | Alsup et al. | |
| 2010/0223512 A1 | 9/2010 | Resnick | |
| 2012/0079237 A1 * | 3/2012 | Combs | G06F 9/3016 712/32 |
| 2012/0079248 A1 | 3/2012 | Combs et al. | |

OTHER PUBLICATIONS

Moudgill, et al., "Register Renaming and Dynamic Speculation: an Alternative Approach"; IEEE 1993, 12 pages.
PCT International Search Report and Written Opinion for PCT Application No. PCT/US2011/052875 mailed Apr. 20, 2012, 11 pages.

* cited by examiner

*Primary Examiner* — Cheng-Yuan Tseng
(74) *Attorney, Agent, or Firm* — Lowenstein Sandler LLP

(57) ABSTRACT

A processor includes a microcode storage to store a first microcode subroutine and a microcode caller of the first microcode subroutine. The processor further includes a first microcode alias storage comprising a first plurality of microcode alias locations and a second microcode alias storage comprising a second plurality of microcode alias locations. The processor further includes a first logic, coupled to the first microcode alias storage and to the second microcode alias storage, wherein the first logic is configured to select a first one of a) the first microcode alias storage for storage of a parameter location in one of the first plurality of microcode alias locations or b) the second microcode alias storage for storage of the parameter location in one of the second plurality of microcode alias locations.

20 Claims, 18 Drawing Sheets

CONTEXT CONTROL AND PARAMETER PASSING WITHIN MICROCODE BASED INSTRUCTION ROUTINES

TECHNICAL FIELD

Embodiments described herein generally relate to the field of processors, processing logic, microprocessors, and associated instruction set architecture, and in particular to microcode used within processors, processing logic and microprocessors.

BACKGROUND

Certain processors, and other instruction execution apparatus, conventionally implement higher-level machine instructions as lower-level microinstructions. In some cases, the microinstructions or microcode may be arranged or logically divided into microcode subroutines and microcode callers. For example, the microcode callers may call the microcode subroutines to have certain operations performed within the shared microcode subroutines. In the call to the microcode subroutine, and in the return from the microcode subroutine, parameters are typically passed or communicated between the microcode callers and the microcode subroutines. The use of microcode subroutines may offer various potential advantages, such as, for example, the ability to reduce the amount of microcode that needs to be stored. However, the uses and benefits of microcode subroutines are limited by certain aspects.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
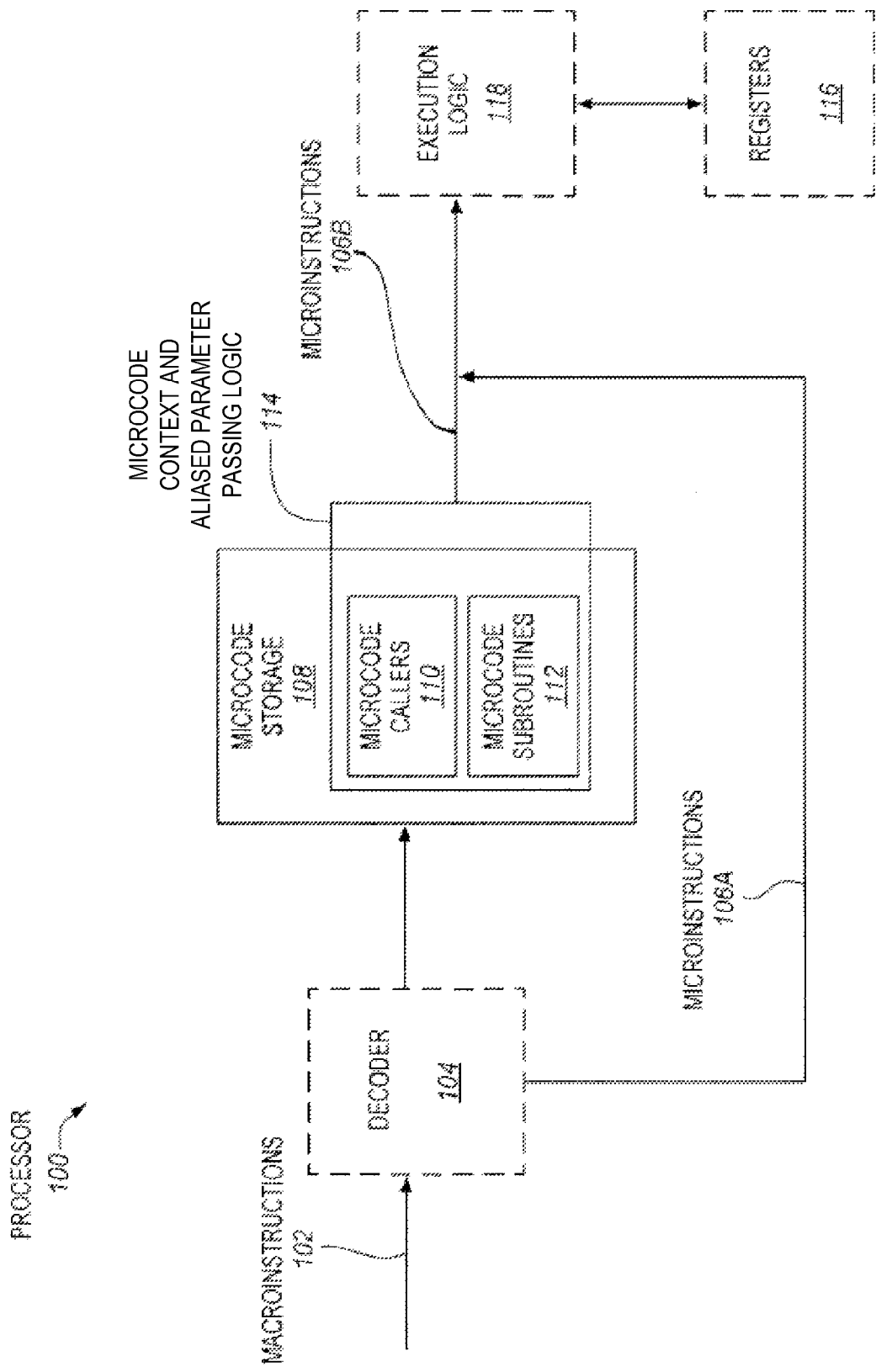
FIG. 1 is a block diagram of an embodiment of a processor having an embodiment of a microcode aliased parameter passing logic.

Described herein are various embodiments of processors that use nested microinstructions. The processors may include multiple different microcode alias registers, each of which may include multiple microcode alias register locations. These microcode alias register locations are usable to store parameter locations for parameters that will be used by microcode. The microcode alias register locations provide a layer of indirection between the microcode and the actual parameter locations (e.g., for inputs and outputs) used by the microcode. This provides increased flexibility in the design of microcode, and enables microcode subroutines to be called by other microcode, which improves efficiency of processor design.

A logic of the processor may select a context and an associated microcode alias register for use by a microcode subroutine. If that microcode subroutine calls another microcode subroutine (or causes the other microcode subroutine to be called), then the logic may select a new context and an associated new microcode alias register for use by the other microcode subroutine. This other microcode subroutine may be considered to be "nested" in the first microcode subroutine. After the second microcode subroutine completes its operations, it may return to the original microcode subroutine. Responsive to such a return, the logic may switch the context back to the original microcode alias register. Use of multiple different microcode aliased registers enables the parameter locations of a first microcode subroutine to be maintained while a second microcode subroutine is executing. As a result, nesting of microcode subroutines is enabled. Such nesting can further improve the performance of processors that use microcode.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the described embodiments. It will be apparent, however, to one skilled in the art that these specific details need not be employed to practice the described embodiments. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring embodiments of the present invention.

Although the following embodiments are described with reference to a processor, other embodiments are applicable to other types of integrated circuits and logic devices. Similar techniques and teachings of embodiments of the present invention can be applied to other types of circuits or semiconductor devices that can benefit from higher pipeline throughput and improved performance. The teachings of embodiments of the present invention are applicable to any processor or machine that performs data manipulations. However, the present disclosure is not limited to processors or machines that perform 512 bit, 256 bit, 128 bit, 64 bit, 32 bit, or 16 bit data operations and can be applied to any processor and machine in which manipulation or management of data is performed. In addition, the following description provides examples, and the accompanying drawings show various examples for the purposes of illustration. However, these examples should not be construed in a limiting sense as they are merely intended to provide examples of embodiments of the present invention rather than to provide an exhaustive list of all possible implementations of embodiments of the present invention.

Although the below examples describe instruction handling and distribution in the context of execution units and logic circuits, other embodiments of the present invention can be accomplished by way of a data or instructions stored on a computer-readable, tangible medium, which when performed by a machine (e.g., a computing device) cause the machine to perform functions consistent with at least one embodiment of the invention. In one embodiment, functions associated with embodiments of the present invention are embodied in computer-readable instructions. The instructions can be used to cause a general-purpose or special-purpose processor that is programmed with the instructions to perform described operations. Embodiments of the present invention may be provided as a computer program product or software which may include a machine or computer-readable medium having stored thereon instructions which may be used to program a computer (or other electronic devices) to perform one or more operations described herein. Alternatively, operations of embodiments of the present invention might be performed by specific hardware components that contain fixed-function logic for performing the operations, or by any combination of programmed computer components and fixed-function hardware components.

FIG. 1 is a block diagram of an embodiment of a processor 100 having an embodiment of a microcode context and aliased parameter passing logic 114. The processor may be any of various complex instruction set computing (CISC) processors, various reduced instruction set computing (RISC) processors, various very long instruction word (VLIW) processors, various hybrids thereof, or other types of processors.

In one or more embodiments, the processor 100 may be a general-purpose processor, such as, for example, one of the general-purpose processors manufactured by Intel Corporation, of Santa Clara, Calif. A few representative examples of suitable general-purpose processors available from Intel Corporation include, but are not limited to, Intel® Atom™ Processors, Intel® Core™ processors, Intel® Core™2 processors, Intel® Pentium® processors, and Intel® Celeron® processors.

Alternatively, the processor may be a special-purpose processor. Representative examples of suitable special-purpose processors include, but are not limited to, network processors, communications processors, cryptographic processors, graphics processors, co-processors, embedded processors, and digital signal processors (DSPs), to name just a few examples. These processors can also be based on CISC, RISC, VLIW, hybrids thereof, or other types of processors. In still other embodiments, the processor or instruction processing apparatus may represent a controller (e.g., a microcontroller), or other type of logic circuit capable of processing microcode or microinstructions.

The processor 100 includes a decoder 104. The decoder 104 may receive and decode higher-level machine instructions or macroinstructions 102. The decoder 104 may generate and output one or more lower-level microinstructions 106A based on or derived from the macroinstructions. The microinstructions output from the decoder 104 may represent micro-operations, micro-ops, mu.ops, micro-code entry points, or other microinstructions. The microinstructions may implement the operations of the higher-level or machine-level instructions through lower-level (e.g., circuit-level or hardware-level) operations. The processor or apparatus may have particular circuitry responsive to the microinstructions.

The decoder 104 may be implemented using various different types of mechanisms. Examples of suitable types of mechanisms include, but are not limited to, microcode read only memories (ROMs), look-up tables, hardware implementations, programmable logic arrays (PLAs), and the like. In some cases, the decoder may represent, or be replaced or supplemented by, an instruction emulator, an instruction translator, an instruction morpher, an instruction interpreter, or other instruction conversion logic. Various different types of instruction emulators, instruction morphers, instruction translators, and the like, are known in the arts. The decoder 104 or other instruction conversion logic may be implemented in hardware (e.g., circuitry), firmware, software, or a combination thereof.

The processor 100 also includes a microcode storage 108. The microcode storage 108 stores microcode, or groups or sequences of microinstructions. The decoder 104 may provide certain instructions to the microcode storage and the microcode storage 108 may further decode these instructions into microinstructions 106B. As further shown, in one or more embodiments, the microcode in the microcode storage 108 may include, or be logically divided into, microcode callers 110 and microcode subroutines 112. The microcode callers 110 may call the microcode subroutines 112 to have certain operations performed within the microcode subroutines 112. The microcode subroutines 112 may perform the operations and return to the microcode caller 110. Alternatively, the microcode subroutine 112 may represent a shared microcode routine that is shared by multiple callers, but does not necessarily return to the microcode caller.

One potential advantage of using the microcode callers and subroutines is that it may help to reduce the overall size of the microcode. For example, microcode for operations (e.g., commonly performed operations) may be placed in a shared subroutine, which may be called each time those operations need to be performed. This may help to avoid replicating or duplicating the microcode for these operations at each location where the operations associated with the microcode subroutine need to be performed. Reducing the amount of microcode may help to reduce the amount of memory or storage needed to store the microcode, which may potentially help to reduce the size, cost, and power consumption of the processor 100.

Another potential advantage to using microcode subroutines is a reduction in the amount of code that needs to be debugged and/or validated. For example, the microcode of the microcode subroutine may be debugged and validated once. In contrast, if the microcode subroutine did not exist, multiple copies of the microcode, for example one at each location where the operations associated with the microcode subroutine will be performed, may need to be debugged and validated. Reducing the amount of microcode that will be debugged and validated may also help to reduce the time and cost of providing the microcode.

However, conventionally the use and benefit of microcode subroutines has been limited. One significant factor is the lack of a flexible way of passing parameters between the microcode callers and the microcode subroutines in the call and in some cases the return if there is a return. For example, the microcode subroutine may expect a parameter (e.g., an input value to be operated on) to be in a fixed or static location (e.g., a fixed or static register assigned for that parameter), and the microcode caller (or all microcode callers of that microcode subroutine), may be forced to use that fixed or static location. In such an instance, the microcode caller would ensure that the parameter is actually located in that fixed or static location. For example, if the microcode subroutine 112 uses a first input parameter in a first fixed register (e.g. Register1) and a second input parameter in a second fixed register (e.g., Register2) and stores a result in a third fixed register (e.g., Register3), then every microcode caller of the microcode subroutine 112 would ensure that the first input parameter is in the first fixed register (Register1) and that the second input parameter is in the second fixed register (Register2). Additionally, the microcode caller would get the result from the third fixed register (Register3).

In conventional processors, when the input parameters are not initially located in the fixed or static locations expected by the microcode subroutine, the microcode caller typically rearranges input parameters from the initial locations to the expected fixed or static locations, prior to calling the microcode subroutine. This may involve performing additional rearrangement operations, for example, to move or copy the parameters from the initial locations to the final locations. Such additional rearrangement operations may tend to reduce the performance of the microcode and/or increase the overall amount of microcode. Moreover, sometimes it may not be possible or practical for the microcode caller to rearrange the values in the registers, for example if a value in a fixed or static register used by the microcode subroutine is used by another instruction and cannot be consumed by moving or copying a value to that register, in which case it may not be possible or practical to utilize the microcode subroutine.

Referring again to FIG. 1, in one or more embodiments, the processor 100 may have the microcode context and aliased parameter passing logic 114. The microcode context and aliased parameter passing logic 114 may be logically disposed or coupled between the decoder 104 and the execution logic. The microcode context and aliased parameter passing logic 114 may be implemented in hardware (e.g., circuitry), software, firmware, or a combination thereof. In one aspect, the microcode context and aliased parameter passing logic 114 includes at least some circuitry. The circuitry may be particular circuitry that is responsive to microinstructions.

The microcode context and aliased parameter passing logic 114 may use aliasing to allow parameters to be flexibly passed or communicated between the microcode callers and the microcode subroutines. For example, in one or more embodiments, the microcode context and aliased parameter passing logic 114 may allow microcode callers to flexibly specify registers or other locations of parameters in microcode alias locations so that the parameters do not have to be located in fixed or static registers expected by the microcode subroutines.

In some embodiments, microcode subroutines may be nested. A nested microcode subroutine may use different inputs and outputs than a parent microcode subroutine that invoked the nested microcode subroutine. Microcode context and aliased parameter passing logic 114 may assign contexts to the different subroutines. Each context may be associated with different microcode alias locations. A first microcode subroutine may be associated with a first context and with a first set of microcode alias locations. The first microcode subroutine may initiate a second microcode subroutine, and in response microcode context and aliased parameter passing logic 114 may designate a second context and a new set of microcode alias locations associated with that second context to the second microcode subroutine. The second (nested) microcode subroutine may use the new set of microcode alias locations associated with the second context without disturbing the first set of microcode alias locations associated with the first context. When the second subroutine returns execution to the first microcode subroutine, microcode context and aliased parameter passing logic 114 may cause the first context to become an active context, and the first microcode subroutine may continue to use the first set of microcode alias locations.

The processor 100 also includes a plurality of registers 116 and execution logic 118. The execution logic 118 may include one or more execution cores each having one or more execution units. In one aspect, the execution units may include at least some hardware (e.g., circuitry). The microinstructions from the microcode storage 108 may be executed by the execution logic 118, with source data potentially being accessed from, and results potentially being stored in, the registers.

To avoid obscuring the description, a relatively simplistic processor has been shown and described. It will be appreciated that the processor may optionally include one or more other well-known components, such as, for example, one or more of instruction fetch logic, branch prediction logic, instruction and data caches, instruction and data translation lookaside buffers, prefetch buffers, microinstruction queues, microinstruction sequencers, bus interface units, second or higher level caches, instruction scheduling logic, retirement logic, register renaming logic, and the like, and various combinations thereof.

Figure 2A:
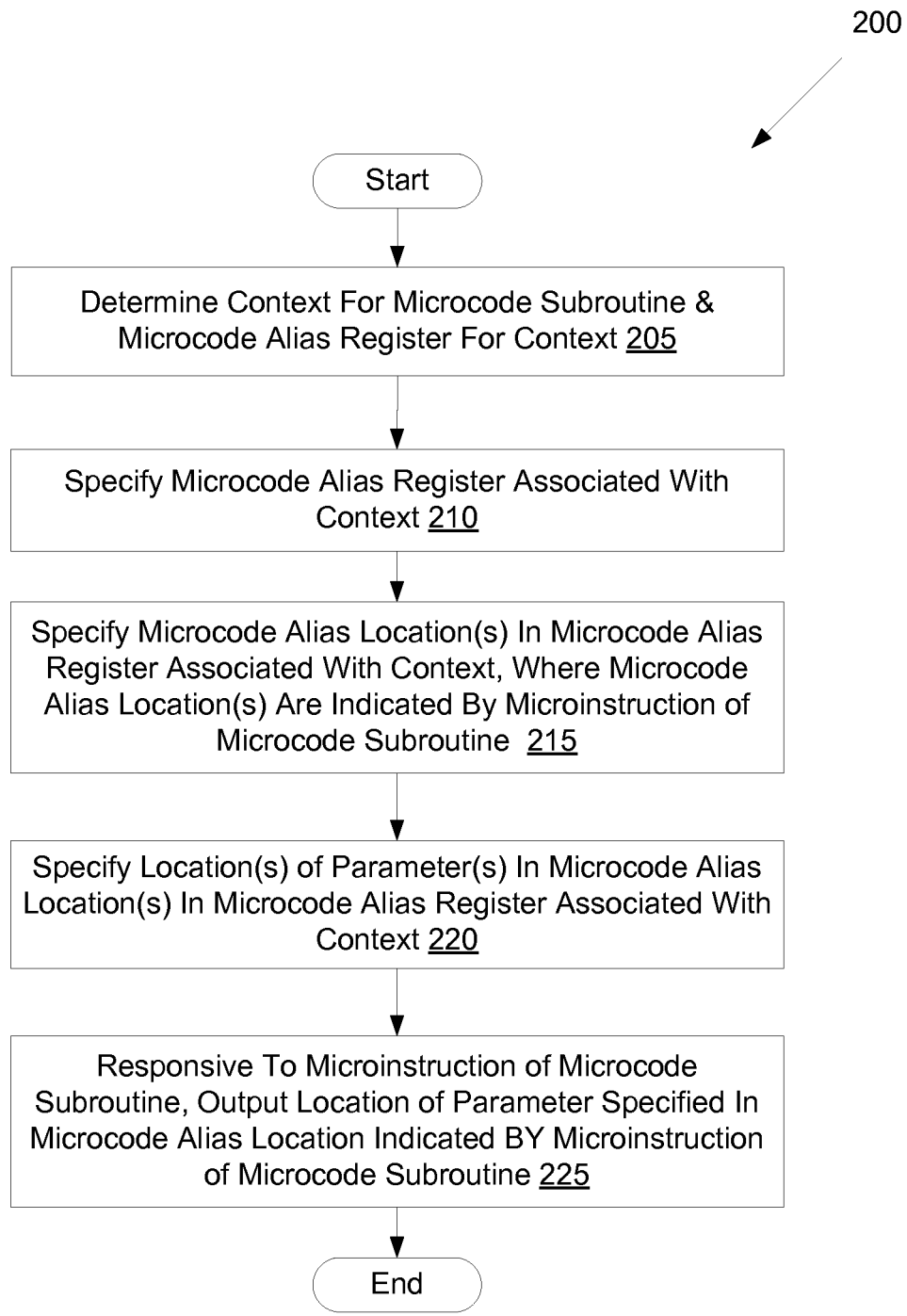
FIG. 2A is a block flow diagram of an embodiment of a method of passing parameters between a microcode caller and a microcode subroutine.

FIG. 2A is a block flow diagram of an embodiment of a method 200 of passing parameters between a microcode caller and a microcode subroutine. In one or more embodiments, the method may be performed by and/or within a processor or other instruction processing apparatus. For example, in one or more embodiments, the method may be performed by processing logic of processor 100 of FIG. 1. Alternatively, the method 200 may be performed by and/or within a processor or other instruction processing logic.

The method includes a microcode caller of a microcode subroutine determining a context for the microcode subroutine and further determining a microcode alias register (or other microcode alias storage) for the context, at block 205. At block 210, the microcode caller specifies the microcode alias register associated with the context. At block 215, the microcode caller specifies one or more microcode alias locations in the microcode alias register. The microcode alias locations may be indicated by a microinstruction of the microcode subroutine. At block 220, the microcode caller specifies a location of a parameter in the microcode alias location in the microcode alias register associated with the context. By way of example, in one or more embodiments, the microcode caller may have at least one of a microinstruction and a special marker (e.g., a special marker) to specify the location of the parameter, for example by writing a value representing a particular register where the parameter is stored, in the microcode alias location. In one embodiment, a logic allows for one or more special properties for microinstructions via a field used as a special marker. The location of the parameter may be, for example, a location of source data or a location where a result is to be stored.

Method 200 also includes, responsive to the microinstruction of the microcode subroutine, determining and outputting the location of the parameter specified in the microcode alias location, at block 225. In one or more embodiments, the microinstruction of the microcode subroutine may indicate the microcode alias location as a fixed or static microcode alias location for that particular microinstruction and for that particular parameter. In one or more embodiments, the microcode caller may dynamically map or associate a flexible location (e.g., a location that is any one of several possible acceptable locations) of that particular parameter with the fixed or static microcode alias location pointed to or indicated by the microinstruction.

This may provide a flexible approach for passing parameters between microcode callers and microcode subroutines. Rather than a microcode caller having to ensure that a parameter is actually located in a fixed or static register expected by a microinstruction of a microcode subroutine, and move or copy the parameter if it is not initially located in that fixed or static register, the microcode caller may instead dynamically specify a flexible location of the parameter in a fixed or static microcode alias location, pointed to or indicated by the microinstruction. Advantageously, this may help to avoid moving, copying, or otherwise rearranging the location of the parameter, which may improve performance by eliminating operations and/or may reduce the total amount of microcode, which may potentially reduce the cost, size, and power consumption of the processor.

Figure 2B:
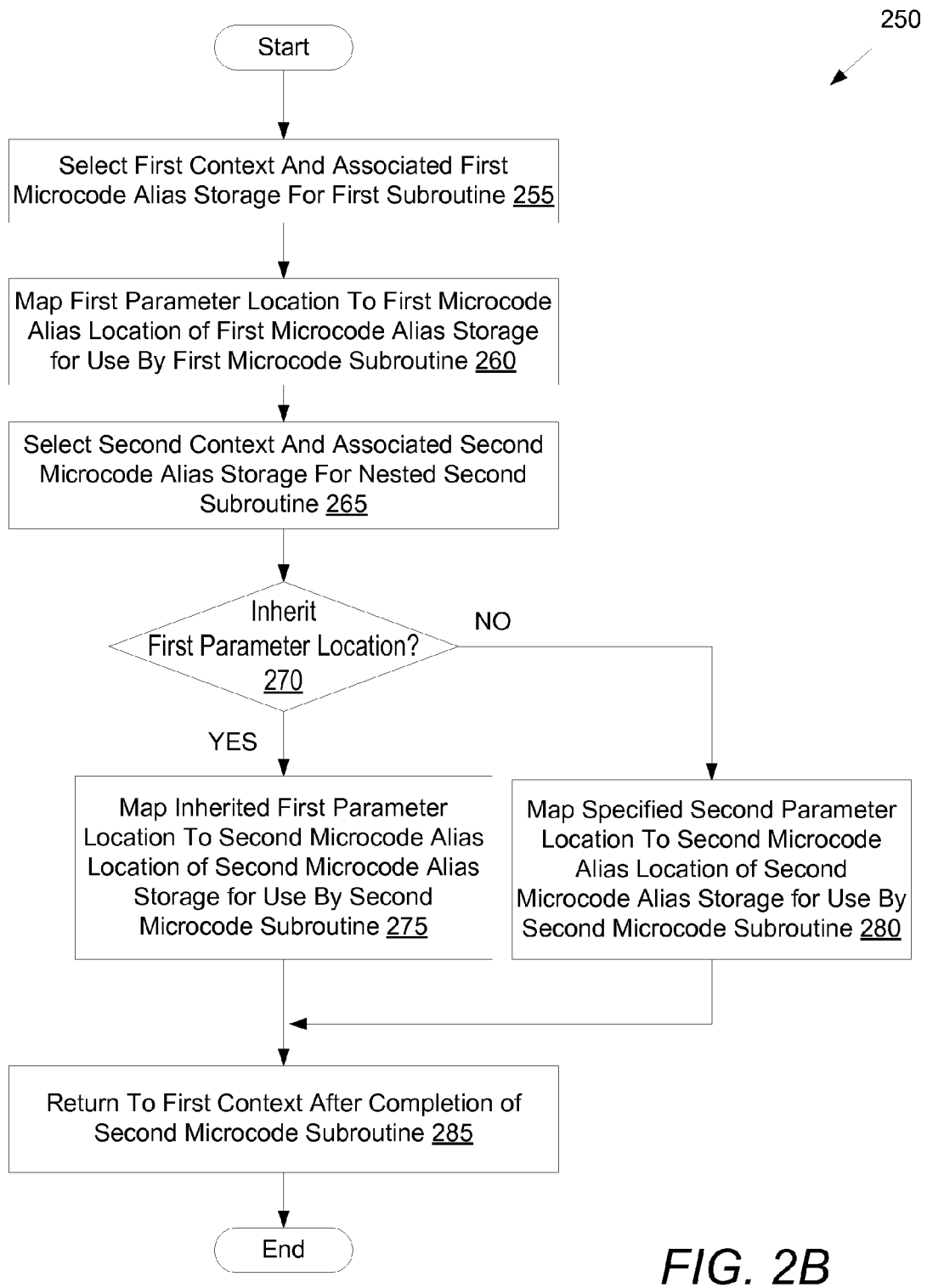
FIG. 2B is a block flow diagram of an embodiment of a method of controlling context for nested microcode subroutines.

FIG. 2B is a block flow diagram of an embodiment for a method 250 of controlling context for nested microcode subroutines. In one or more embodiments, the method may be performed by and/or within a processor or other instruction processing apparatus. For example, in one or more embodiments, the method may be performed by processing logic of processor 100 of FIG. 1. Alternatively, the method 250 may be performed by and/or within a processor or other instruction processing logic.

At block 255 of method 250, processing logic selects a first context and an associated first microcode alias storage for a first subroutine. The association between the microcode alias storage and the context may be predetermined or may be specified by the processing logic. At block 260, processing logic maps a first parameter location to a first microcode alias location of the first microcode alias storage for use by the first microcode subroutine.

At block 265, after the first microcode subroutine calls a second (nested) microcode subroutine, processing logic selects a second context and associated second microcode alias storage for the second nested microcode subroutine. At block 270, processing logic determines whether the first parameter location is to be inherited for use by the nested subroutine. If so, the method continues to block 275. Otherwise, the method proceeds to block 280.

At block 275, processing logic maps the inherited first parameter location to a second microcode alias location of the second microcode alias storage for use by the second microcode subroutine. At block 280, processing logic maps a second parameter location to a second microcode alias location of the second microcode alias storage for use by the second microcode subroutine.

At block 285, the second microcode subroutine may include a return microinstruction that returns to the first microcode subroutine. Responsive to execution of the return microinstruction, processing logic may return to the first context, which typically occurs after completion of the second microcode subroutine. The method then ends.

Figure 3:
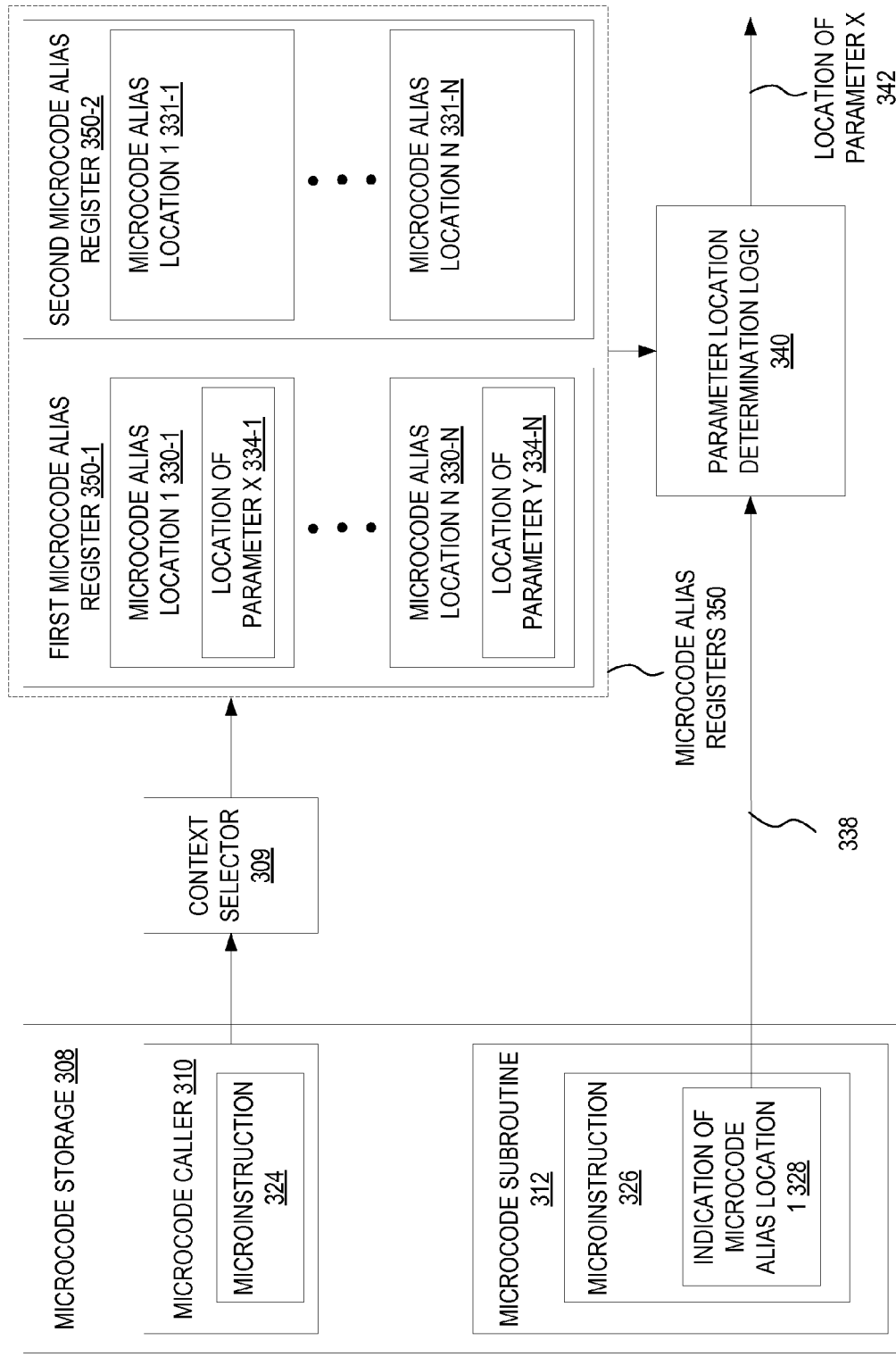
FIG. 3 is a block diagram of an embodiment of microcode context and aliased parameter passing logic.

FIG. 3 is a block diagram of an embodiment of microcode context and aliased parameter passing logic 314. In one or more embodiments, the logic 314 may be included in the processor 100 of FIG. 1, or one similar, or an entirely different instruction processing apparatus. In one or more embodiments, the logic 314 may perform the method of FIGS. 2A-2B, or one similar. However, it is to be understood that the logic 314 may perform operations and methods different than those shown in FIGS. 2A-2B. Moreover, the operations or method discussed above for FIGS. 2A-2B may be performed by microcode aliased parameter passing logic either the same as, or similar to, or entirely different than, the logic 314.

Referring again to FIG. 3, the microcode context and aliased parameter passing logic 314 includes a microcode storage 308. The microcode storage 308 may represent a memory or storage device that is operable to store, or that stores, microcode. The microcode storage 308 may be implemented with various different types of memory or storage devices. Examples of suitable types of memory or storage devices include, but are not limited to, read only memories (ROMs), programmable logic arrays (PLAs), static random access memories (SRAMs), and flash memories. Microinstructions of the microcode may be accessed from the microcode storage, for example by a microsequencer (not shown), which may generate addresses to step through the microcode in the microcode storage 308.

As shown in FIG. 3, the microcode storage 308 stores a microcode caller 310 and a microcode subroutine 312. The microcode caller 310 is to be interpreted broadly as a portion of the microcode that is operable to call the microcode subroutine 312. For example, the microcode caller 310 may have a microinstruction 324, special marker (e.g., flowmarker), or other logic or portion of the microcode that is operable to call the microcode subroutine 326. The microcode caller 310 may include more than just the microinstruction 324 or special marker that calls the microcode subroutine 312.

The microcode subroutine 312 is to be interpreted broadly as a portion of the microcode that is operable to be called by the microcode caller 310. In embodiments, the microcode subroutine 312 may return to the microcode caller 310. Alternatively, in another embodiment, the microcode subroutine 312 may represent a shared microcode routine that is shared by multiple callers, but may not necessarily return to the microcode caller 310. The microcode of the microcode caller 310 and/or subroutine 312 may include one or more microinstructions 324, 326 that are to be executed on specific or particular circuitry or other logic (e.g., software combined with hardware and/or firmware) of the processor. To simplify the illustration and the description, only a single microcode caller 310 and a single microcode subroutine 312 are shown, although it is to be appreciated that there may be many of each, including potentially multiple microcode callers of the same shared microcode subroutine.

The microcode context and aliased parameter passing logic 314 also includes a context selector 309. Additionally, the context and microcode aliased parameter passing logic 314 may include multiple microcode alias registers 350, each of which may include multiple microcode alias locations 330. In the illustrated embodiment, the microcode alias registers 350 include a first microcode alias register 350-1 and a second microcode alias register 350-2. First microcode alias register 350-1 may include a first microcode alias location 330-1 through an Nth microcode alias location 330-N, where the number N represents a positive integer number, typically ranging from two to about ten. Second microcode alias register 350-2 may also include a first microcode alias location 331-1 through an Nth microcode alias location 330-N. In one embodiment, the number of microcode alias locations (N) may be four, although the scope of the invention is not limited in this respect. Note that first microcode alias register 350-1 and second microcode alias register 350-2 may contain the same number of microcode alias locations (as shown) or a different number of microcode alias locations. For example, first microcode alias register 350-1 may include 8 microcode alias locations and second microcode alias register 350-2 may include 4 microcode alias locations.

In one or more embodiments, each of the microcode alias locations 330, 331 is operable to store or represent a value (e.g., an integer number). In various example embodiments, the microcode alias locations 330, 331 may be different locations in the same register, different locations in different registers, different discrete dedicated storage locations, different locations in a table, different locations in a data structure, or a combination thereof, to name just a few examples.

The microcode subroutine 312 includes a given microinstruction 326. The given microinstruction 326 may be of various different types, such as an add microinstruction, an exclusive OR microinstruction, a load microinstruction, etc. The microinstruction has or includes an indication 328 of a microcode alias location. In the particular example of the illustration, the indication 328 of the microinstruction 326 points to or indicates the first microcode alias location 330-1, although this is merely for purposes of illustration. The indication may either be implicit to the microinstruction 326, or the indication may be explicitly specified by the microinstruction (e.g., through a field of bit values). In one or more embodiments, the indication 328 of the microcode alias location may be fixed or static for a particular corresponding parameter for the particular given microinstruction 326. In other words, the microinstruction 326 may expect to find the location of the particular corresponding parameter in the fixed or static microcode alias location pointed to by the indication 328. Likewise, multiple microinstructions, or potentially each microinstruction in the microcode subroutine, may indicate microcode alias register locations where the locations of parameters are expected.

Context selector 309 may be a logic (e.g., that includes hardware, software, firmware, or a combination thereof) that assigns a context to the microcode subroutine 312, and may select one of the microcode alias registers 350 to associate with the context. The number of contexts that may be used may depend on the number of microcode alias registers 350 that are available. In the illustrated example there are two microcode alias registers. Accordingly, context selector 309 may assign a first context or a second context to the microcode subroutine 312. However, in alternative embodiments more than two microcode alias registers may be used. In one embodiment, each microcode alias register has a fixed association with a particular context. Alternatively, contexts may be dynamically assigned to microcode alias registers.

Once a context and microcode alias register has been selected for microcode subroutine 312, microcode caller 310 may write or otherwise specify a location of the particular corresponding parameter in the microcode alias location of the associated microcode alias register. As mentioned, the microcode alias location may be pointed to or indicated by the indication 328 of the microinstruction 326 (e.g., in this example the microcode alias location 1 330-1). In one or more embodiments, the microcode caller 310 may include a dedicated microinstruction (e.g., a write microinstruction), a special marker, a special marker attached to a microinstruction, or another portion of the microcode caller, to write or otherwise specify the location of the parameter in the microcode alias location. The special marker or microinstruction that specifies the location does not have to be the same special marker or microinstruction that calls the microcode subroutine.

Commonly the locations should be specified in the microcode alias locations before the microcode subroutine accesses them. However, the locations may be specified in the microcode alias locations before the actual microinstruction or special marker performs the call to the microcode subroutine, for example anywhere from several to many microinstructions before the call microinstruction. Alternatively, the locations may be specified in the call microinstruction itself. The processor may have a circuit or other hardware to perform the write responsive to the microinstruction or special marker.

In one or more embodiments, the location of the parameter may be a value indicating a register or other storage location where the parameter is stored. For example, in one or more embodiments, the location of the parameter specified in the microcode alias location may be an integer number, where the integer number represents a register number specifying a particular register where the parameter is stored. The register storing the parameter may be an integer register, floating point register, segment register, or control register, for example, depending on the context of the operation being performed and/or depending on the microinstruction.

It may be known or understood in advance of the microcode caller specifying the location of the parameter in the microcode alias location (in this example the microcode alias location 1 330-1) that the microinstruction 326 includes the indication 328 of that particular microcode alias location (in this example the microcode alias location 1 330-1) for the corresponding parameter. For example, a micro-programmer may know that the microinstruction 326 includes the indication 330 of the microcode alias location (in this example the microcode alias location 1 330-1) corresponding to the particular parameter, and the micro-programmer may program the microcode caller to write the location of the particular parameter in this indicated microcode alias location (in this example the microcode alias location 1 330-1). This may allow the microcode caller to dynamically map or associate a flexible location (e.g., a location that is any one of several possible acceptable locations) of the particular parameter with the fixed or static microcode alias location pointed to by the indication 328 of the microinstruction 326. Advantageously, this may help to avoid the microcode caller moving the particular parameter from an initial register location to a fixed or static register location expected by the microinstruction of the microcode subroutine.

Various different types of parameters are suitable. The parameter may represent a parameter that is passed between the microcode caller and the microcode subroutine. Examples of suitable parameters include, but are not limited to, one or more source data (e.g., a first source data and a second source data), one or more results, one or more immediate data, a parameter specifying a type of microoperation to be performed (e.g., whether an addition or a subtraction type of operation is to be performed), a parameter specifying a mode in which a particular microoperation is to be performed (e.g., whether or not an operation is to be performed with saturation, rounding, etc.), a parameter specifying a mode or way in which one or more arithmetic flags are to be used (e.g., whether or not addition is to be performed with carry, overflow, etc.), and combinations thereof, to name just a few examples. In one or more particular example embodiments, the parameter may be one of a first source data, a second source data, and a result, or a combination thereof, although the scope of the invention is not limited in this respect.

Referring again to FIG. 3, the microcode context and aliased parameter passing logic 314 also includes parameter location determination logic 340. The parameter location determination logic 340 may include hardware, software, firmware, or a combination thereof. In one or more embodiments, the parameter location determination logic 340 may include at least some circuitry. The parameter location determination logic is coupled with the microcode alias registers 350 and with the microcode alias locations 330, 331 included in the microcode alias registers 350.

The parameter location determination logic 340 is responsive to the microinstruction 326 of the subroutine 312, to receive the indication 328 of the microcode alias location from the microinstruction 326 (in this example indicating the first microcode alias location 330-1). The microcode caller 310 has specified a location 334-1 of a parameter in the microcode alias location corresponding to the indication 328 (which in this example is the first microcode alias location 330-1). The parameter location determination logic 340 is operable to determine a context and associated microcode alias register 350 that has been assigned to the microcode subroutine 312 (first microcode alias register 350-1 in the illustrated example). The present context and its associated microcode alias register 350 may be determined from a stored context identifier (not shown) that is accessible to the parameter location determination logic 340. Once the context is determined, parameter location determination logic 340 determines the location 334-1 of the parameter specified in the microcode alias location that is pointed to or indicated by or that corresponds to the indication 328 (which in this example is the first microcode alias location 330-1).

The parameter location determination logic 340 may output the determined location 342 of the parameter. By way of example, the determined location of the parameter may be passed down the pipeline, for example to or toward execution logic (e.g., one or more execution cores) or other back end logic. In one aspect, the locations of the parameters may be written or specified in one cycle and output the next cycle with no additional serialization performed between the subroutine caller (the microcode alias location writer) and the microcode subroutine (the microcode alias location reader). Without limitation, the execution logic may execute the operation(s) associated with the microinstruction on or according to the parameter located in the now resolved location of the parameter.

Advantageously, the microcode context and aliased parameter passing logic 314 may provide a flexible mechanism for passing the parameter between the microcode caller 310 and the microcode subroutine 312. Instead of the microcode caller 310 ensuring that the parameter is located in a fixed or static register expected by the microinstruction of the microcode subroutine, and moving or copying the parameter if it is not initially located in that fixed or static register, the microcode caller may instead specify a flexible location of the parameter in a fixed or static microcode alias location pointed to by the indication of the microinstruction. Advantageously, this may help to avoid moving, copying, or otherwise rearranging the location of the parameter, which may help to improve performance by eliminating operations and may reduce the total amount of microcode, which may reduce the cost and power consumption of the processor. Also, different microcode callers of the same shared microcode subroutine may optionally specify different locations for the same particular parameter for the same particular microinstruction of the microcode subroutine.

Figure 4:
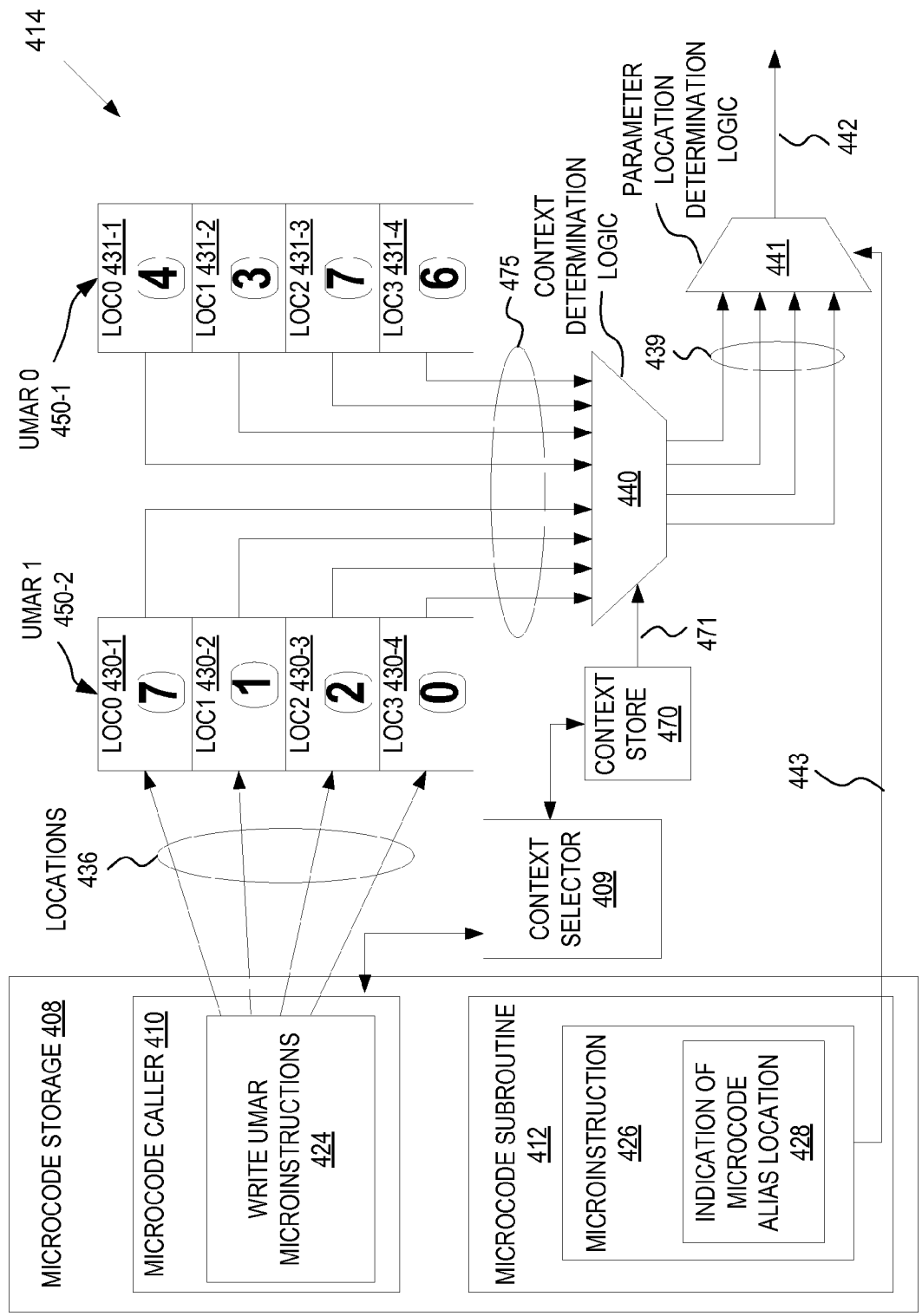
FIG. 4 is a block diagram of another embodiment of a microcode context and aliased parameter passing logic.

FIG. 4 is a block diagram of an example embodiment of a microcode context and aliased parameter passing logic 414 having an example pair of microcode alias registers (UMARs) 450. The microcode context and aliased parameter passing logic 414 also includes a microcode storage 408, a microcode caller 410, a microcode subroutine 412, and a microinstruction 426 of the microcode subroutine 412. The microcode storage 408, the microcode caller 410, the microcode subroutine 412, and the microinstruction 426 may optionally be similar to, or the same as, the correspondingly named components of the logic 314 of FIG. 3. To avoid obscuring the description, all of these similarities will not be unnecessarily repeated, but rather the discussion below will focus on the different and/or additional characteristics of the logic 414 of FIG. 4.

The microcode alias registers 450 each have multiple microcode alias register locations. As shown in the illustrated example embodiment, the microcode alias registers 450 each have four microcode alias register locations, in the illustration labeled as LOC0, LOC1, LOC2, and LOC3, although the scope of the invention is not limited to just four locations.

Figure 5:
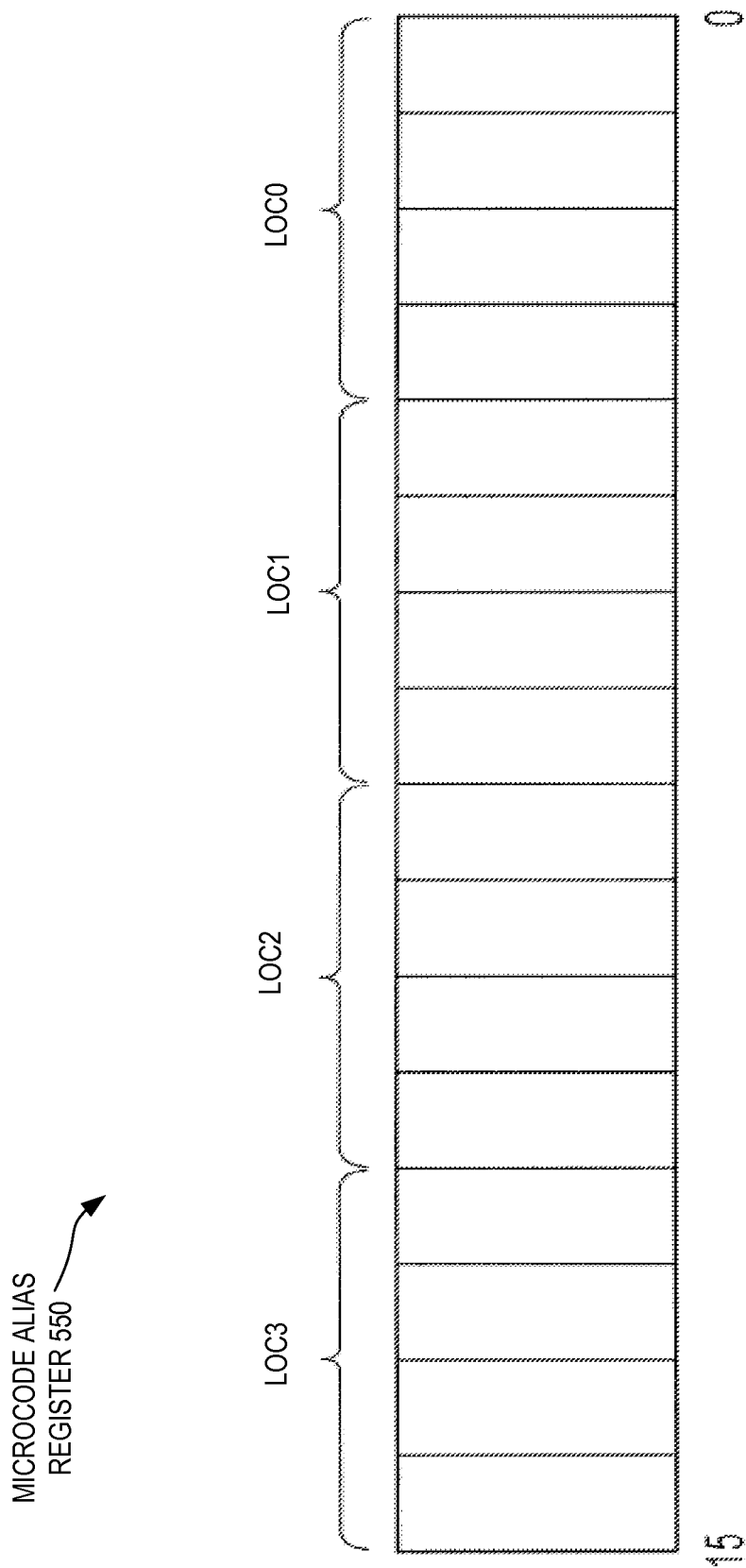
FIG. 5 is a block diagram of a particular example embodiment of a 16-bit microcode alias register.

FIG. 5 is a block diagram of a particular example embodiment of a 16-bit microcode alias register (UMAR) 550. The UMAR 550 has 16-bits which may be logically divided into up to four groups of four contiguous bits. Each of the four, 4-bit groups may be used to store a value representing a location of a parameter. As shown, in one example, bits 3:0 may be used to store LOC0, bits 7:4 may be used to store LOC1, bits 11:8 may be used to store LOC2, AND bits 15:12 may be used to store LOC3. The values stored in the UMAR may refer to locations in the integer, floating point, or segment register file depending on the context of the operation being performed. In alternate embodiments, either fewer or more locations, each having either fewer or more bits for each location, including not necessarily the same number of bits for each location, are also suitable.

Referring again to FIG. 4, in the example microcode alias locations 431-1 through 431-4 have already been populated with parameter locations. For example, first microcode alias location (LOC0) 431-1 is populated with value 4, second microcode alias location (LOC1) 431-2 is populated with value 3, third microcode alias location (LOC2) 431-3 is populated with value 7 and fourth microcode alias location (LOC3) 431-4 is populated with value 6.

Further in the example, the microinstruction 426 of the microcode subroutine 412 has an indication 428 of a microcode alias register location (which may be LOC0, for example). For example, the indication may be @LOC0, where the symbol @ indicates an aliased location. The microcode caller 410 of the microcode subroutine 412 is operable to write or otherwise specify a location of a parameter in the microcode alias register location indicated by the microinstruction of the microcode subroutine 412. As shown, in one or more embodiments, the microcode caller 410 may include a write microinstruction 424 to write or specify the location. Alternatively, instead of the write microinstruction, a special marker, a flow marker, or other portion of the microcode caller 410 may write or specify the location.

In one embodiment, context selector 409 selects a context for the microcode subroutine 412. Context selector 409 may detect that microcode caller 410 will call microcode subroutine 412, and may select the context responsive to the detection. Alternatively, context selector 409 may select the context for microcode subroutine 412 responsive to other triggers (e.g., responsive to microcode caller 410 being called by another microcode subroutine). To select a context, context selector 409 may determine whether microcode subroutine 412 and/or microcode caller 410 were initiated by another microcode subroutine, and may further determine what context was used by the previous microcode subroutine. If the microcode subroutine was called based on activity of another microcode subroutine (e.g., is nested within another microcode subroutine), then context selector may increment a current context. For example, if the previous subroutine had context 0, then context selector may select context 1 for microcode subroutine 412. If there are only two UMARs (as in the present example), then context selector 409 may toggle the context between two values (e.g., between 0 and 1) to switch between contexts.

Selecting a context for microcode subroutine 412 may additionally include associating a UMAR (e.g., UMAR 0 or UMAR 1) to the selected context. Context selector 409 may select an unused UMAR for association with the selected context. For example, if UMAR 0 is in use for the previous context, then context selector 409 may select UMAR 1 for the current context.

Once a context has been selected, context selector 409 may set a context ID to have a value (e.g., 0 or 1) for the selected context, and may store the context ID in a context store 470. Context selector 409 may additionally indicate the UMAR associated with the current context in the context store 470, which may be a register or other storage device. Context selector 409 may additionally identify the selected context and/or UMAR for microcode subroutine 412 to microcode caller 410.

Optionally, the write microinstruction 424 may write multiple locations 436 in the microcode alias register locations of the UMAR associated with the selected context. For example, as shown, the write microinstruction may write the integer values 7, 1, 2, and 0 in the four microcode alias register locations LOC0 430-1, LOC1 430-2, LOC2 430-3, and LOC3 430-4, respectively. The integer values 7, 1, 2, and 0 are merely examples for purposes of illustration. Each of these integer values (i.e., 7, 1, 2, 0) may represent a register number or other location where a different corresponding parameter is stored (e.g., Register7, Register1, Register2, and Register0). In one or more embodiments, the values or locations may be written with values from an immediate field of the microinstruction and/or the microcode caller.

A context determination logic 440 is coupled with both microcode alias registers 450-1 and 450-2. Context determination logic 440 may receive 471a current context from context ID 470. Based on the current context, context determination logic 440 may determine whether to use the microcode alias register locations from UMAR0 450-1 or from UMAR1 450-2.

The example context determination logic 440 includes a multiplexer (MUX). The MUX represents one suitable selection circuit or selection logic, although other selection circuits, selection logic, or substitutes for the MUX known in the arts are also suitable. The MUX is coupled to receive as inputs the output of each of the microcode alias register locations for each of the UMARs 450. For example, as shown lines or paths 475 may couple outputs of each of the microcode alias register locations 430-1 to 430-4 and 431-1 to 431-4 with corresponding inputs to the MUX. The MUX is also coupled by a line or path 471 to receive as a control input the context ID 470. The MUX is operable to select or determine outputs corresponding to, indicated by, or based on, the context ID 470. As one example, if context ID is context 1 (associated with UMAR 1 450-2), then the MUX may select or determine that the microcode alias register locations 430-1 to 430-4 should be selected and output.

The parameter location determination logic 441 is coupled with the context determination logic 440. The parameter location determination logic 441 is operable, responsive to the microinstruction 426 of the microcode subroutine, to receive the indication 428 of a microcode alias register location from the microinstruction 426. The parameter location determination logic 441 is operable to determine the location 436 of the parameter specified in the microcode alias register location pointed to by the indication 428 of the microinstruction 426 (e.g., which may be @LOC0).

The example parameter location determination logic 441 includes a multiplexer (MUX). The MUX represents one suitable selection circuit or selection logic, although other selection circuits, selection logic, or substitutes for the MUX known in the arts are also suitable. The MUX is coupled to receive as inputs the output of each of the microcode alias register locations passed by the context determination logic 440. For example, as shown lines or paths 439 may couple outputs of the microcode alias register locations of a selected context with corresponding inputs to the MUX. The MUX is also coupled by a line or path 443 to receive as a control input the indication 428 of the microcode alias register location of the microinstruction. The MUX is operable to select or determine one of the inputs corresponding to, indicated by, or based on, the indication 428 or control input.

As one example, if the indication 428 of the microcode alias register location is @LOC0, where the symbol @ designates an alias, then the MUX may select or determine the integer value 7 which in this example is stored or represented in UMAR0 450-2. The MUX may output the integer value 7 at an output thereof. The integer value 7 may represent a location of the corresponding parameter associated with the indication 428. By way of example, the integer value 7 may represent Register7 where the parameter is stored. Accordingly, the indication @LOC0 of the microinstruction 426 may be transformed via the microcode alias register 450-2, the context determination logic 440 and the parameter location determination logic 441 to the integer value 7 indicating Register7 where the parameter corresponding to the indication is stored.

Figure 6:
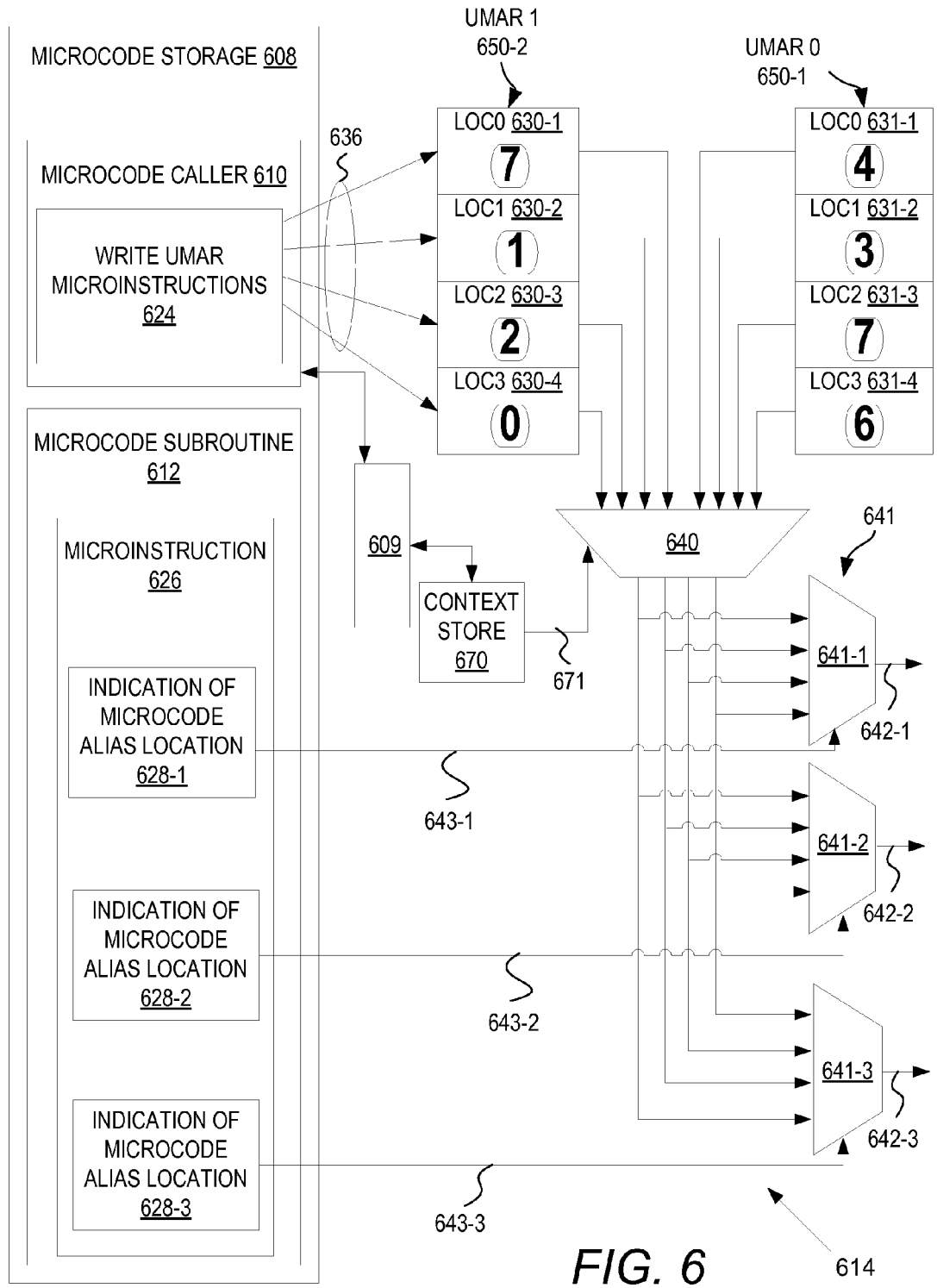
FIG. 6 is a block diagram of another embodiment of a microcode context and aliased parameter passing logic.

FIG. 6 is a block diagram of an example embodiment of a microcode context and aliased parameter passing logic 614 having a first microcode alias register (UMAR 1) 650-1 and a second microcode alias register (UMAR 2) 650-2. Microcode context and aliased parameter passing logic 614 additionally includes a context selector 609, a context ID 670, a context determination logic 640, and one or more parameter location determination logics 641 to determine locations of a first source, a second source, and a result. The microcode context and aliased parameter passing logic 614 also includes a microcode storage 608, a microcode caller 610, and a microcode subroutine 612. The components of microcode context and aliased parameter passing logic 614 may optionally be similar to, or the same as, the correspondingly named components of the logics of FIG. 3 or 4. To avoid obscuring the description, all of these similarities will not be unnecessarily repeated, but rather the discussion below will focus on the different and/or additional characteristics of the logic 614 of FIG. 6.

The illustrated microcode alias registers 650-1 and 650-2 each have four microcode alias register locations, labeled LOC0 630-1 and 631-1, LOC1 630-2 and 631-2, LOC1 630-3 and 631-3, and LOC3 630-4 and 631-4, although the scope of the invention is not limited to just four locations. Additionally, instead of the microcode alias registers (UMARs) other microcode alias storage devices disclosed herein may alternatively be used.

A microinstruction 626 of the microcode subroutine has a first indication 628-1 of a first microcode alias register location corresponding to a first source used by the microinstruction 626, a second indication 628-2 of a second microcode alias register location corresponding to a second source used by the microinstruction 626, and a third indication 628-3 of a third microcode alias register location corresponding to a result used by the microinstruction 626. In some cases, the same microcode alias register location may be indicated for both a source and a result.

The context selector 609 is operable to select a context and an associated UMAR for the microcode subroutine 612. After selecting the context, context selector 609 updates a context store 670 to indicate the current context. In some instances, the context selector 609 may determine that it will not return to an original context (e.g., of a calling microcode subroutine). In such an instance, context selector 609 may discard the original context and later redefine it.

The microcode caller 610 of the microcode subroutine 612 is operable to write or otherwise specify locations of the first source, the second source, and the result in the microcode alias register locations of the indicated by the indications 628 of the microinstruction. The microcode caller 610 may write these locations in a UMAR associated with a current context that was selected for the microcode subroutine 612. The microcode caller 610 may specify a first location (e.g., a value representing a first register) of the first source in the first microcode alias register location (LOC0) 630-1 indicated by the microinstruction, specify a second location of the second source in the second microcode alias register location (LOC1) 630-2 indicated by the microinstruction, and specify a third location for the result in the third microcode alias register location (LOC2) 630-3 indicated by the microinstruction of the subroutine.

As shown, in one or more embodiments, the microcode caller 610 may include a write microinstruction 624 to write or specify these locations. Alternatively, instead of the write microinstruction, a special marker, a special marker attached to a microinstruction, or other portion of the microcode caller may write or specify the locations. By way of example, as shown, the write microinstruction may write the integer values 7, 1, 2, and 0 in the four microcode alias register locations LOC0 630-1, LOC1 630-2, LOC2 630-3 and LOC3 630-4, respectively. Each of these integer values (i.e., 7, 1, 2, 0) may represent a register number or other location where a different corresponding parameter is stored (e.g., Register7, Register1, Register2, and Register0).

The context determination logic 640 is coupled with both microcode alias registers 650-1 and 650-2. Context determination logic 640 may receive 671 a current context from context store 670. Based on the current context, context determination logic 640 may determine whether to use the microcode alias register locations from UMAR0 650-1 or from UMAR1 650-2.

The example context determination logic 640 includes a multiplexer (MUX). The MUX represents one suitable selection circuit or selection logic, although other selection circuits, selection logic, or substitutes for the MUX known in the arts are also suitable. The MUX is coupled to receive as inputs the output of each of the microcode alias register locations for each of the UMARs 650. For example, as shown lines or paths may couple outputs of each of the microcode alias register locations 630-1 to 630-4 and 631-1 to 631-4 with corresponding inputs to the MUX. The MUX is also coupled by a line or path 671 to receive as a control input the context ID and/or other context information from context store 670. The MUX is operable to select or determine outputs corresponding to, indicated by, or based on, the context ID. As one example, if context ID is context 1 (associated with UMAR 1 650-2), then the MUX may select or determine that the microcode alias register locations 630-1 to 630-4 should be selected and output.

The parameter location determination logic 641 is coupled with the context determination logic 640. The parameter location determination logic 641 is operable, responsive to the microinstruction 626 of the microcode subroutine 612, to receive the first indication 628-1 of one of the microcode alias register locations corresponding to the first source (e.g., @LOC0), the second indication 628-2 of one of the microcode alias register locations corresponding to the second source (e.g., @LOC2), and the third indication 628-3 of one of the microcode alias register locations corresponding to the result (e.g., @LOC1).

The example parameter location determination logic 641 for each of the first source, the second source, and the result in the example embodiment includes a multiplexer (MUX), although other selection circuits, selection logic, or substitutes for the MUX known in the arts are also suitable. Each of the MUXs 641-1, 641-2, 641-3 is coupled to receive as inputs the output of each of the microcode alias register locations output from context determination logic 640. For example, as shown lines or paths may couple outputs of each of LOC0 630-1, LOC1 630-2, LOC2 630-3, and LOC4 630-4 with corresponding inputs of each of the three MUXs. Other inputs not pertinent to this disclosure may also optionally be provided to the MUX, for example those pertaining to different fields of variable length instructions. Each of the MUXs is also coupled by a separate line or path 643 to receive as a control input a corresponding one of the indications 628 of a microcode alias register location for a corresponding one of the parameters. For example, the upper MUX 641-1 is coupled to receive as a control input the first indication 643-1 corresponding to the first source, the middle MUX 641-2 is coupled to receive as a control input the second indication 643-2 corresponding to the second source, and the bottom MUX 641-3 is coupled to receive as a control input the third indication 643-3 corresponding to the result. Each of the MUXs is operable to select or determine one of the inputs from the microcode alias register corresponding to, indicated by, or based on, the indication or control input provided to that particular MUX.

As one example, if the microinstruction of the microcode subroutine is of the form result=first source+second source, and has the particular indications @LOC1=@LOC0+@LOC2, where each symbol @ designates an alias, then the upper MUX 641-1 may select or determine the integer value 7 which in this example is stored or represented in LOC0 630-1, the middle MUX 641-2 may select or determine the integer value 2 which in this example is stored or represented in LOC2 630-3, and the lower MUX 641-3 may select or determine the integer value 1 which in this example is stored or represented in LOC1 630-2. By way of example, the integer value 7 may represent Register7 where the first source data is stored, the integer value 2 may represent Register2 where the second source data is stored, and the integer value 1 may represent Register1 where the result generated by the microinstruction is to be stored. Continuing with this example, the aliased indications of the microinstruction @LOC1=@LOC0+@LOC2 may be transformed via the microcode alias register 650-2, the context determination logic 640 and the parameter location determination logic 641 to Register1=Register7+Register2.

Figure 7:
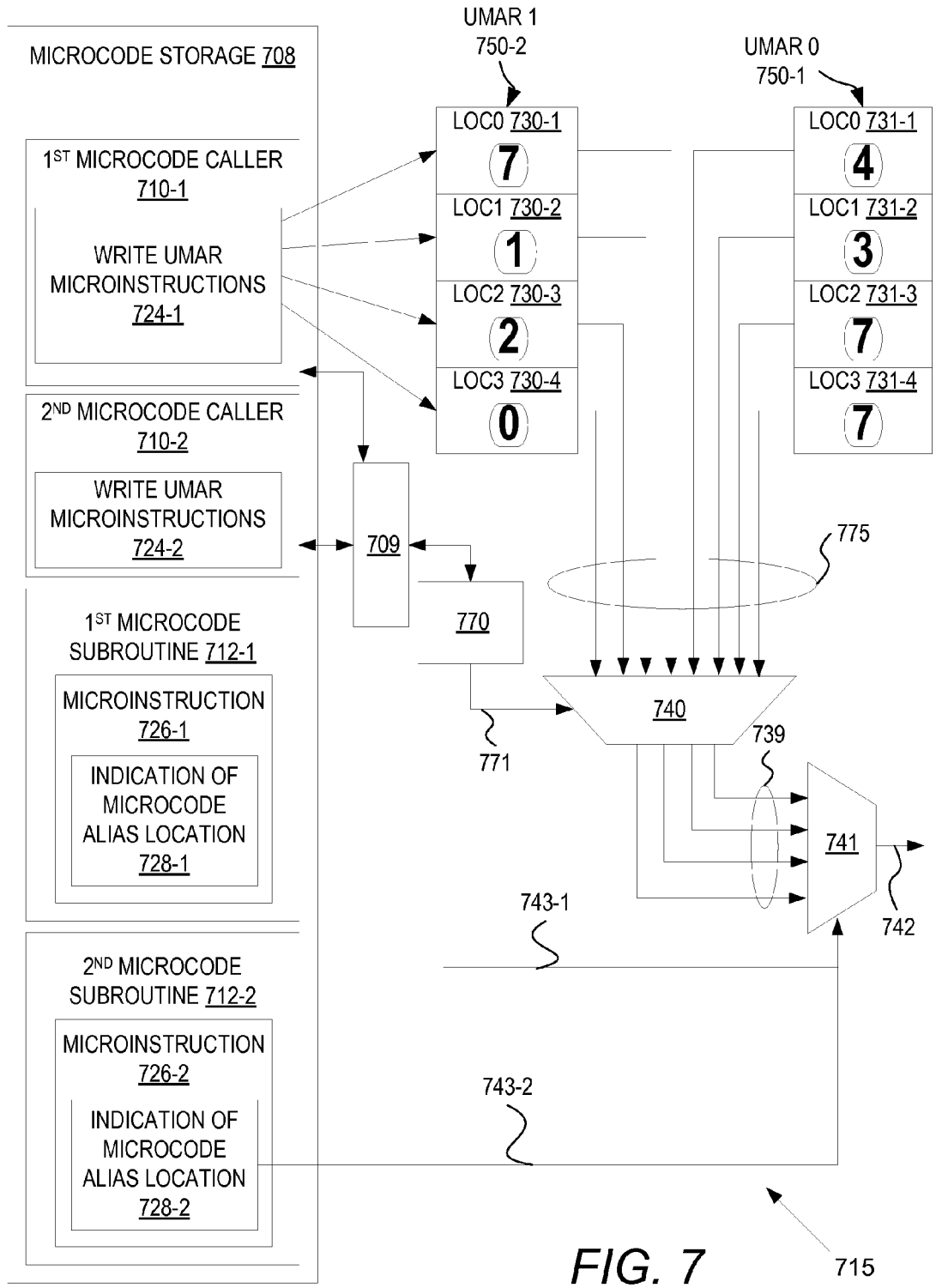
FIG. 7 is a block diagram of another embodiment of a microcode context and aliased parameter passing logic.

FIG. 7 is a block diagram of an example embodiment of a microcode context and aliased parameter passing logic 714 having a pair of microcode alias registers (UMARs) 750. The microcode context and aliased parameter passing logic 714 also includes a microcode storage 708, a first microcode caller 710-1, a second microcode caller 710-2, a first microcode subroutine 712-1, a second microcode subroutine 712-2, a first microinstruction 726-1 of the first microcode subroutine 712-1 and a second microinstruction 726-2 of the second microcode subroutine 712-2. The components of microcode context and aliased parameter passing logic 714 may optionally be similar to, or the same as, the correspondingly named components of the logics 314, 414 and 614 of FIGS. 3, 4 and 6. To avoid obscuring the description, all of these similarities will not be unnecessarily repeated, but rather the discussion below will focus on the different and/or additional characteristics of the logic 714 of FIG. 7.

The microcode alias registers 750 each have multiple microcode alias register locations. As shown in the illustrated example embodiment, the microcode alias registers 750 each have four microcode alias register locations, in the illustration labeled as LOC0, LOC1, LOC2, and LOC3, although the scope of the invention is not limited to just four locations.

In the example microcode alias locations 731-1 through 731-4 have already been populated with parameter locations 4, 3, 7, and 0, respectively, by write UMAR microinstructions 724-2 of second microcode caller 710-2. Further in the example, first microcode caller 710-1 includes a write microinstruction 724-1 to write or specify parameter values to microcode alias locations in first UMAR 750-2 based on a context specified by context selector 709.

First microcode caller 710-1 may have been called by second microcode subroutine 712-2. In one embodiment, second microcode subroutine 712-2 is associated with a context of 0 and UMAR 0 750-1, while first microcode subroutine 712-1 is associated with a context of 1 and UMAR 1 750-2.

Context selector 709 may assign and/or keep track of contexts and UMARs associated with microcode subroutines. Additionally, context selector 709 may track return addresses for microcode subroutines. Accordingly, when second microcode subroutine 712-2 calls first microcode subroutine 712-1, context selector 709 may record a microcode instruction pointer (UIP) to the second microcode subroutine 712-2. Context selector 709 may maintain a UIP stack in the context store 770. This UIP stack may be usable to return from the nested first microcode subroutine 712-1 to the second microcode subroutine 712-2.

Optionally, the write microinstruction 724 may write multiple locations in the microcode alias register locations of the second UMAR 750-2. For example, as shown, the write microinstruction 724-1 may write the integer values 7, 1, 2, and 0 in the four microcode alias register locations LOC0 730-1, LOC1 730-2, LOC2 730-3, and LOC3 730-4, respectively.

A context determination logic 740 is coupled with both microcode alias registers 750-1 and 750-2. Context determination logic 740 may receive 771a current context from context store 770. Based on the current context, context determination logic 740 may determine whether to use the microcode alias register locations from UMAR0 750-1 or from UMAR1 750-2.

The example context determination logic 740 includes a multiplexer (MUX). The MUX is coupled to receive as inputs the output of each of the microcode alias register locations for each of the UMARs 750. For example, as shown lines or paths 775 may couple outputs of each of the microcode alias register locations 730-1 to 730-4 and 731-1 to 731-4 with corresponding inputs to the MUX. The MUX is also coupled by a line or path 771 to receive as a control input the context ID. The MUX is operable to select or determine outputs corresponding to, indicated by, or based on, the context ID. While first microcode subroutine 712-1 is active, the context remains as context 1. Accordingly, the indication of microcode alias location 728-1 received from microinstruction 726-1 enables the parameter location determination logic 741 to select a microcode alias location from the first UMAR 750-1.

As one example, if the indication 728-1 of the microcode alias register location is @LOC0, then the parameter location determination logic 741 may select or determine the integer value 4 which in this example is stored or represented in LOC0 731-1 of the first UMAR 750-1. After first microcode subroutine 712-1 terminates, it may return to second microcode subroutine 712-2. This may cause context selector 709 to switch a current context from context 0 to context 1. Accordingly, context determination logic 740 may select as outputs data from the second UMAR 750-2.

The first microcode subroutine 712-1 may use a return microinstruction (not shown) that causes the context to toggle and that uses a stored UIP value (which may be stored in a UIP stack) as a return address. The UIP value may be a pointer to an address of second microcode instruction 712-2 in the illustrated example. Alternatively, the return microinstruction may specify a specific context to return to. This enables full flexibility for both subroutines that do not have information on their current context as well as subroutines that will control specific context switching behavior.

Microinstruction 726-2 may provide an indication of microcode alias location 728-2 to parameter location determination logic 741. If the indication 728-2 of the microcode alias register location is @LOC0, then the parameter location determination logic 741 may select or determine the integer value 7 which in this example is stored or represented in LOC0 730-1 of the second UMAR 750-2. Accordingly, the same indication of @LOC0 by the different microcode subroutines may refer to microcode alias locations of different microcode alias registers, depending on a current context.

Figure 8:
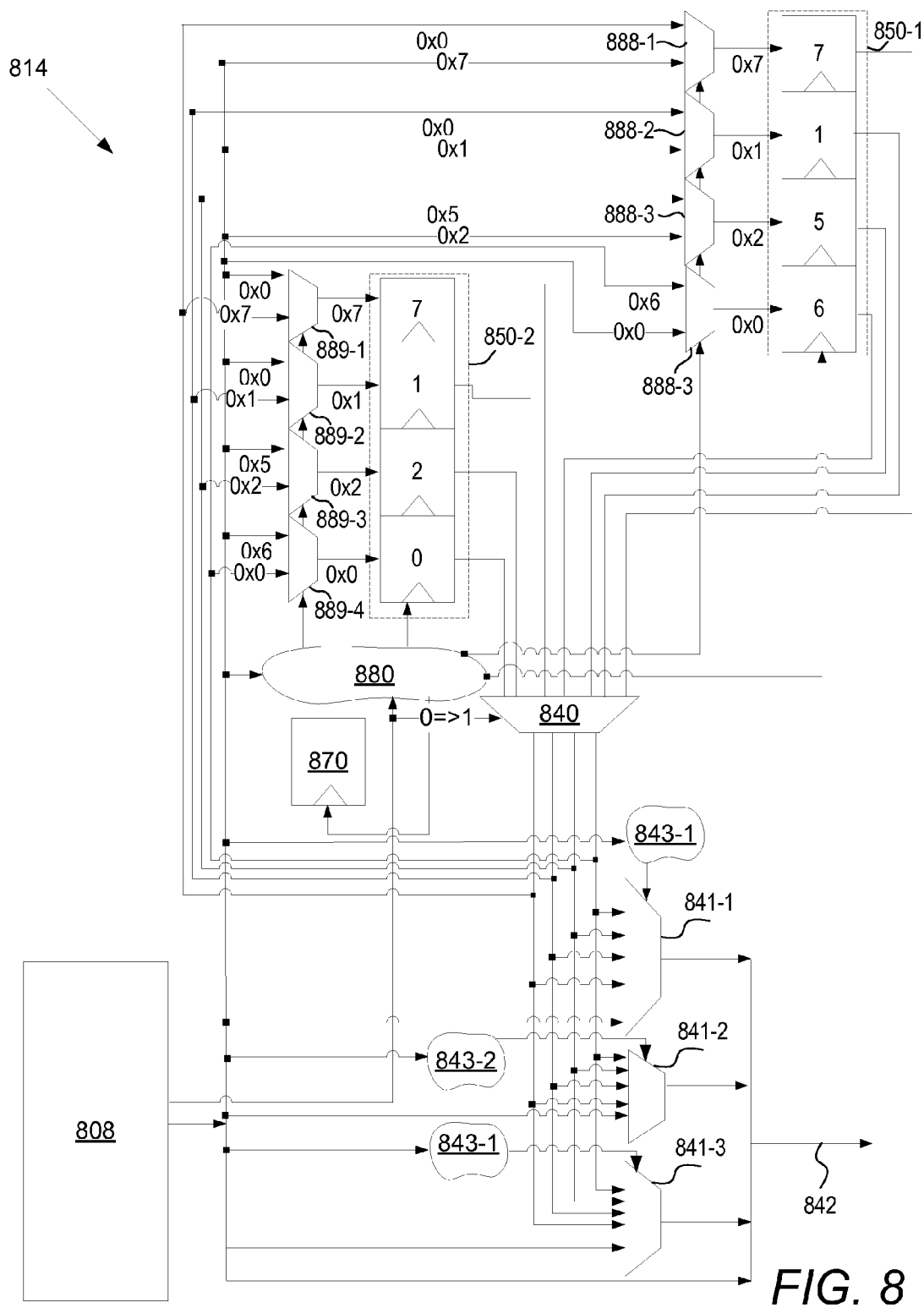
FIG. 8 is a block diagram of another embodiment of a microcode context and aliased parameter passing logic.

FIG. 8 is a block diagram of an example embodiment of a microcode context and aliased parameter passing logic 814 having a pair of microcode alias registers (UMARs) 850-1 and 850-2. The microcode context and aliased parameter passing logic 814 also includes a microcode storage 808 (which may be a read only memory (ROM) operation sequencer in one embodiment). The microcode storage 808 may include one or more microcode callers and/or microcode subroutines. The microcode context and aliased parameter passing logic 814 also includes a context determination logic 840, multiple parameter location determination logics 841-1, 841-2, 841-3 and a context storage 870. These components may be similar to, or the same as, the correspondingly named components of the logics 314, 414, 615 and 714 of FIGS. 3, 4, 6 and 7. To avoid obscuring the description, all of these similarities will not be unnecessarily repeated, but rather the discussion below will focus on the different and/or additional characteristics of the logic 814 of FIG. 8.

In microcode context and aliased parameter passing logic 814, logic for writing to microcode alias registers 850-1, 850-2 and logic for controlling context may be included in a UMAR write and context controller 880. UMAR write and context controller 880 may perform some or all of the operations previously described with reference to context selector 609 and write UMAR microinstructions 624.

In microcode context and aliased parameter passing logic 814, the input of each microcode alias location in the UMARs 850-1, 850-2 is coupled to the output of an inheritance logic 888-1 through 888-3 and 889-1 through 889-3, which in the illustrated example are multiplexers (MUX). However, other types of selection logic or circuits may also be used instead of multiplexers. In the illustrated example, the inheritance logics each receive two inputs. A first input into an inheritance logic (e.g., inheritance logic 889-1) is a value output from microcode storage 808 (e.g., by a microcode caller in microcode storage 808). A second input into the inheritance logic is a value stored in a corresponding microcode alias location in another UMAR than the UMAR associated with the inheritance logic. For example, an input of a first microcode alias location of second UMAR 850-2 may be connected to an output of inheritance logic 889-1. Inheritance logic 889-1 has a first input connected to microcode storage 808 and a second input connected to an output of the first microcode alias location of first UMAR 850-1. Based on a control instruction that inheritance logic 889-1 receives from UMAR write and context controller 880, inheritance logic 889-1 may either populate the first microcode alias location of the second UMAR 850-2 with the value stored in first UMAR 850-1 or with the value provided by microcode storage 808. Thus, microinstructions may control which, if any, microcode alias mappings are copied from a UMAR of a previous context.

In an alternative embodiment, the inheritance logics may receive as inputs the values of two or more of the microcode alias locations from another UMAR. Accordingly, a single microcode alias location in a UMAR may inherit its state from any of the microcode alias locations in another UMAR. For example, rather than a 2 to 1 MUX coupled to each microcode alias location of the UMARs, a 5 to 1 MUX may be used having inputs from each of the microcode alias locations of the other UMAR.

Certain processors utilize speculative execution. Speculative execution generally refers to the execution of code speculatively before it is definitively known that the execution of the code is needed. One area in which speculative execution is commonly used is with branch prediction. Branch prediction involves predicting the direction of a branch, for example the direction of microbranch of a conditional branch microinstruction, before the correct direction of the branch is definitively known. For example, the processor may make an educated guess about what direction the conditional branch instruction is most likely to take based on past history. The processor may then start executing instructions speculatively based on the assumption that the predicted branch direction is correct, but before the processor knows whether or not the predicted branch direction is actually correct.

The predicted branch direction will later turn out either to be correct or incorrect. If the predicted branch direction later turns out to be correct, then the results of the speculative execution may be utilized. In this case, the speculative execution offers value in greater utilization of pipeline stages that would otherwise have been dormant or at least underutilized while waiting for the correct direction of the branch direction to be known. Alternatively, if the predicted branch direction turns out to be incorrect, or the branch direction was mispredicted, then the speculative execution past the conditional branch instruction typically should be discarded, and the execution typically should be rewound by jumping or branching back in the control flow to the conditional branch that was mispredicted. The control flow may represent the order in which individual instructions are executed. Execution may then resume, now non-speculatively, with the now definitively know correct branch direction. Other forms of speculative execution are also known in processors.

One challenge is that, when a branch or microbranch in a microcode subroutine is mispredicted, the values stored in the microcode alias locations and the contexts disclosed herein may potentially be altered or changed, between the time when they are initially written or specified, and the time the mispredicted microbranch is detected. If the execution is to be rewound, for example by jumping or branching back in the control flow to the conditional branch that was mispredicted, then the changes or alterations to the values stored in the microcode alias locations and/or to the context may cause these values to be corrupted or invalid for the rewound execution. Similarly, in faults, traps, interrupts, and the like, the values stored in the microcode alias locations and contexts disclosed herein may potentially be altered or changed.

Embodiments disclosed herein allow values in microcode alias locations that correspond to parameters passed between a microcode caller and a microcode subroutine to be stored or preserved elsewhere. Additionally, embodiments provide for storage of contexts and associated microcode alias register information. Further embodiments additionally allow for such values and other information, when or if subsequently needed (e.g., in the event of misprediction of a conditional microbranch) to be restored back to the microcode alias locations and to a context storage. It is to be appreciated that saving and restoring these values is optional and not required. The microcode aliased parameter passing logic previously described may be used either with or without the saving and restoring of these values.

Figure 9:
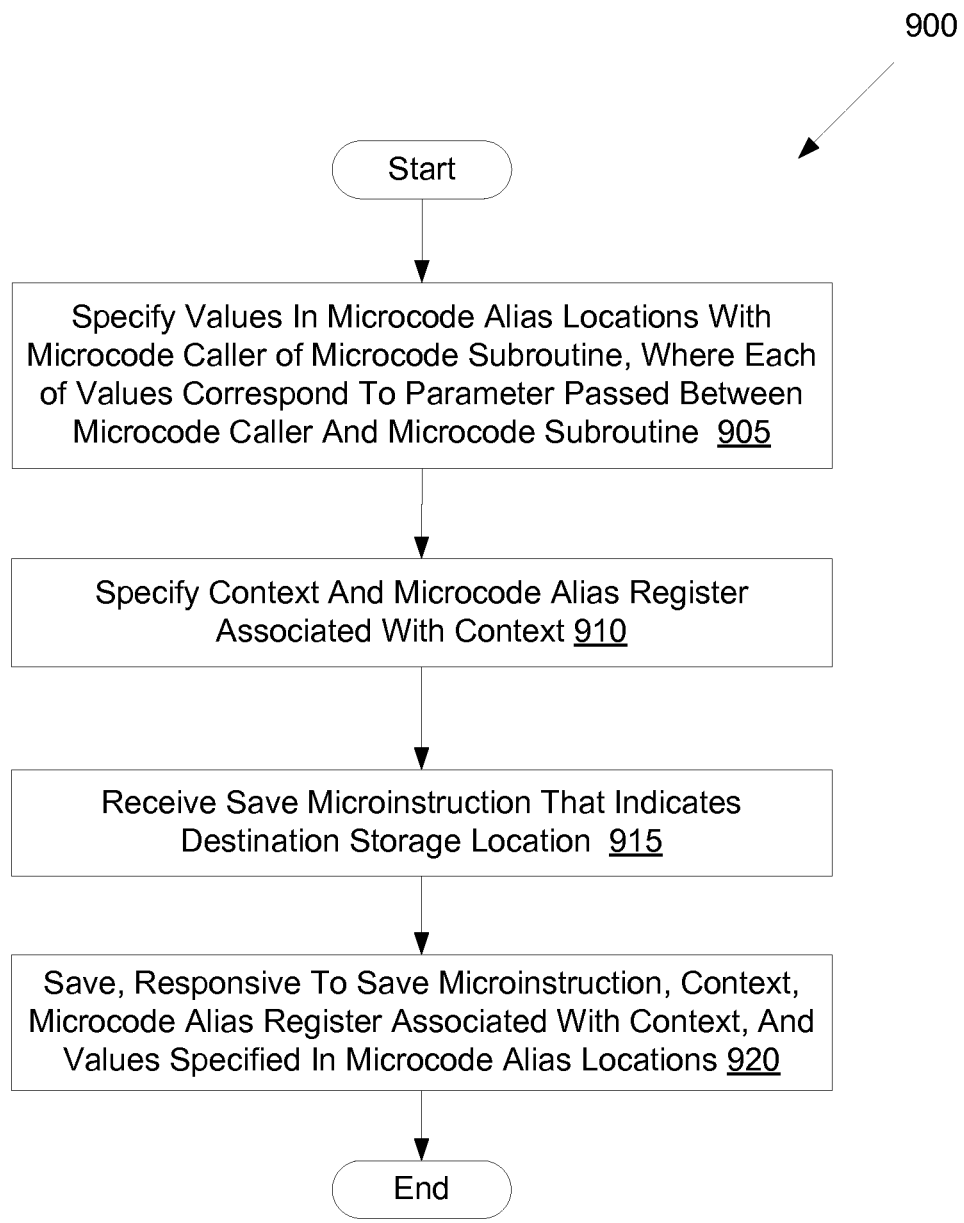
FIG. 9 is a block flow diagram of an embodiment of a method of saving or preserving context and values from microcode alias locations.

FIG. 9 is a block flow diagram of an embodiment of a method 900 of saving or preserving contexts as well as values from microcode alias locations. In one or more embodiments, the method may be performed by and/or within a processor or other instruction processing apparatus. For example, in one or more embodiments, the method may be performed by and/or within the processor 100 of FIG. 1 (e.g., by processing logic in processor 100). Alternatively, the method 900 may be performed by and/or within a processor or other instruction processing apparatus entirely different than the processor of FIG. 1.

The method includes specifying one or more values in microcode alias locations by processing logic (e.g., by a microcode caller of a microcode subroutine), where each of the values corresponds to a parameter passed between the microcode caller and the microcode subroutine, at block 905. In one embodiment, each of the values may represent a location of a corresponding parameter, such as, for example, a register storing a source data or a register where a result is to be stored.

At block 910, processing logic specifies a context and/or a microcode alias register associated with the context. In some instances, the microcode alias register may be inferred from the context. For example, if there are two microcode alias registers, the first microcode alias register may have a fixed association with a context 0 and the second microcode alias register may have a fixed association with a context 1.

At block 915, processing logic receives a save microinstruction indicating a destination storage location. In one embodiment, the save microinstruction may occur in a microcode caller prior to a call to a microcode subroutine, which may have a conditional microbranch instruction. Alternatively, the save microinstruction may occur in the microcode subroutine prior to a conditional microbranch of the subroutine, or prior to corruption of the microcode alias register locations. In one or more embodiments, the destination storage location may be a register, such as a temporary register.

Responsive to the save microinstruction, the values specified in the microcode alias locations of an microcode alias register as well as the context and/or an identity of the microcode alias register may be stored in the destination storage location indicated by the save microinstruction, at block 920. In one embodiment, in addition to the values in the microcode alias locations, the save microinstruction is also operable to save a microinstruction pointer in the destination storage location indicated by the save microinstruction. Although the microinstruction has been termed a save microinstruction, it could be implemented with a move microinstruction, a copy microinstruction, a write microinstruction, or other microinstructions that are able to store the values in the destination storage location.

Figure 10:
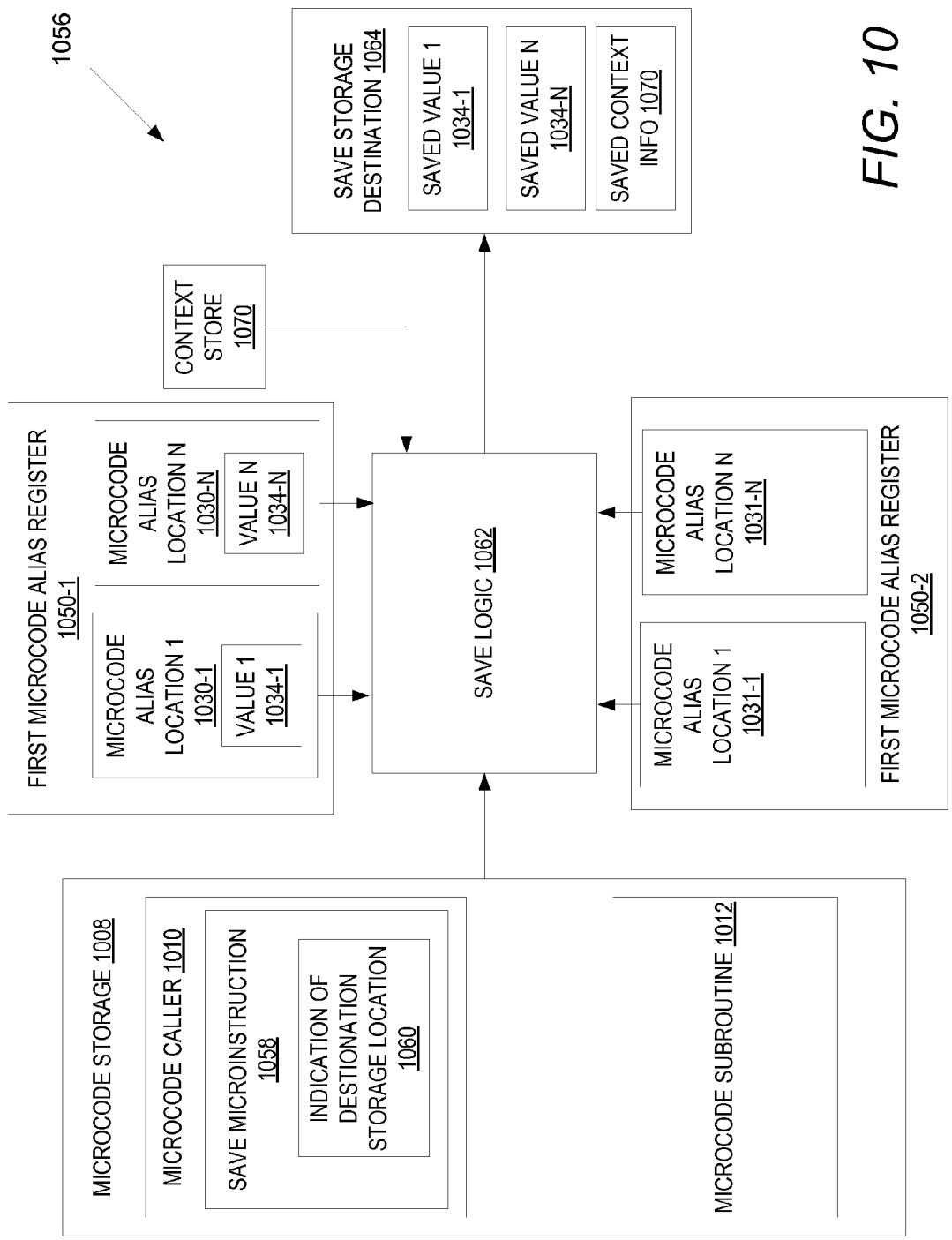
FIG. 10 is a block diagram of an embodiment of microcode context and aliased parameter value save logic.

FIG. 10 is a block diagram of an embodiment of microcode context and aliased parameter value save logic 1056. In one or more embodiments, the logic 1056 may be included in the processor 100 of FIG. 1, or one similar, or an entirely different instruction processing apparatus. In one or more embodiments, the logic 1056 may perform the method of FIG. 9, or one similar. However, it is to be understood that the logic 1056 may perform operations and methods different than those shown in FIG. 9.

The microcode context and aliased parameter value save logic 1056 includes a microcode storage 1008, a microcode subroutine 1012 stored in the microcode storage 1008, a microcode caller 1010 of the microcode subroutine 1012 stored in the microcode storage 1008, and multiple microcode alias locations 1030-1 through 1030-N. The microcode storage 1008, the microcode subroutine 1012, microcode caller 1010, and microcode alias locations 1030 may optionally be similar to, or the same as, the correspondingly named components of preceding figures. To avoid obscuring the description, all of these similarities will not be unnecessarily repeated, but rather the discussion below will tend to focus on the different and/or additional characteristics of the logic 1056 of FIG. 10.

The microcode caller 1010 has a save microinstruction 1058. The save microinstruction 1058 has an indication 1060 of a destination storage location 1064. The indication 1060 may either be implicit to the microinstruction, or the indication 1060 may be explicitly specified by the microinstruction (e.g., through a field of bit values). In one or more embodiments, the indication of the destination storage location may be fixed for the particular save microinstruction. In one or more embodiments, the destination storage location 1064 may be a register, such as, for example, a 32-bit temporary integer register, to name one specific example.

Each of the microcode alias locations 1030 is operable to store, or stores, a value 1034-1 through 1034-N. In the illustration, a first microcode alias location 1030-1 is operable to store, or stores, a first value 1034-1 and an Nth microcode alias location 1030-N is operable to store, or stores, an Nth value 1034-N. Each value may correspond to a parameter passed between the microcode caller and the microcode subroutine, such as in the call and in the return, if there is a return for that particular subroutine. For example, in one or more embodiments, each value may represent a location of the corresponding parameter, such as, for example, a temporary register storing the parameter (e.g., a source data).

The microcode context and aliased parameter value save logic 1056 also includes save logic 1062. The save logic 1062 may include hardware (e.g., a circuit), software, firmware, or a combination thereof. In one or more embodiments, the save logic 1062 may include at least some circuitry. The save logic 1062 is coupled with the microcode alias locations 1030 to receive the values 1034 from the microcode alias locations. The save logic may additionally be coupled to a context store 1070, which may include current context information such as a current context and/or a microcode alias register associated with the current context.

The save logic 1062 is operable, responsive to the save microinstruction 1058, to store or save the values 1034 from the microcode alias locations 1030 to the destination storage location 1064 (e.g., a particular register) indicated by the indication 1060 of the save microinstruction 1058. The save logic 1062 is further operable to store the context information from the context store 1070 into the destination storage location 1064 responsive to the save microinstruction 1058. As shown in the illustration, the context info 1070 and the values 1034-1 through 1034-N may be stored in the destination storage location 1064 as a result of the store microinstruction 1058. Advantageously, this effectively saves or preserves the values 1034 from the microcode alias locations and their associated context so that the context and the values may subsequently be restored if they are needed (e.g., if a mispredict of a conditional microbranch instruction occurs) even if the microcode alias locations and/or context are subsequently overwritten by other microinstructions. Although the microinstruction has been termed a save microinstruction, it could be implemented with a move microinstruction, a copy microinstruction, or other microinstructions that are able to save or store the values in the destination storage location.

If the contents of a UMAR or a context becomes corrupted or otherwise becomes invalid, a restore microinstruction may be used to return the parameter locations and the context information for a microcode subroutine. For example, the restore microinstruction may be used to recover from a branch misprediction. The restore process can be implicit using a current defined context to denote which UMAR the saved parameter locations should be mapped to. The restore process may also be explicit by specifying a specific UMAR to be modified.

Figure 11:
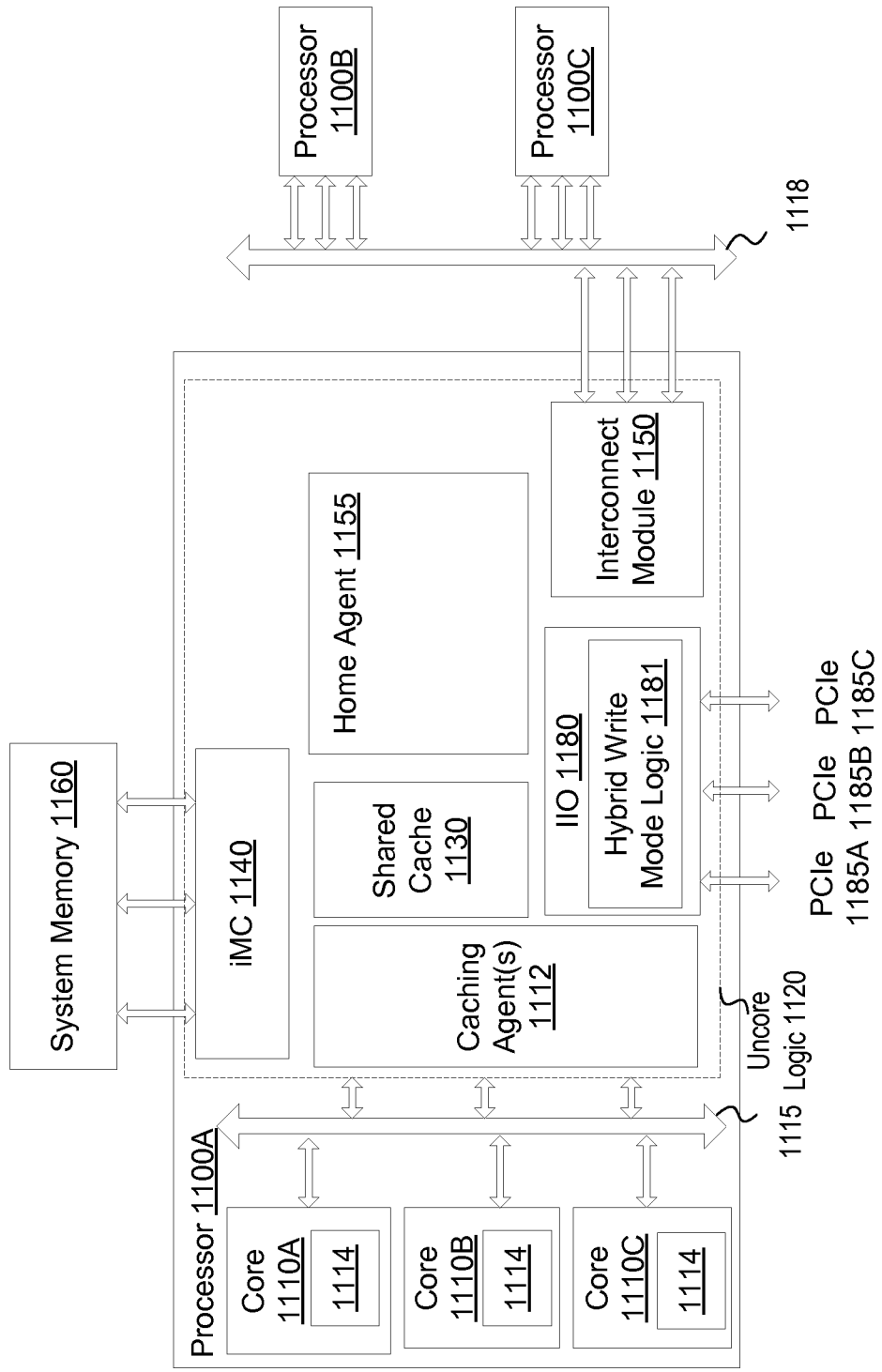
FIG. 11 is a block diagram of a multi-core processor coupled to additional processors, in accordance with an embodiment of the present invention.

Referring now to FIG. 11, shown is a high level block diagram of a processor 1100A in accordance with an embodiment of the present invention. In one embodiment, processor 1100A corresponds to processor 100 of FIG. 1. For example, process or 110A may be a multicore processor including multiple cores 1110A-1110C, where some or all of the cores include a microcode context and aliased parameter passing logic 114 as described with reference to FIG. 1. These cores may be physical processors, and may include various components such as front end units, execution units and back end units.

The various cores may be coupled via an interconnect 1115 to an uncore logic 1120. The uncore logic 1120 is logic of the processor 1110A outside of the cores that includes various components. Uncore logic 1120 may include a shared cache 1130 which may be a last level cache (LLC). In addition, the uncore logic 1120 may include an integrated memory controller (iMC) 1140, a home agent (HA) 1155, one or more caching agents (referred to as Cbos) 1112, an integrated input/output cluster (IIO) 1180, and an interconnect module 1150 that connects the processor 1100A to other processors 1100B, 1100C via an interconnection 1118.

One or more caching agents 1112 (Cbos) manage the interface 1115 between the cores 1110A-C and the shared cache 1130. Thus, caching agents 1112 write data to and read data from cache lines in shared cache 1130. The caching agents 1112 are responsible for managing data delivery between the cores 1110A-C and the shared cache 1112. The caching agents 1112 are also responsible for maintaining cache coherency between the cores 1110A-C within a single socket (e.g., within processor 1100A). This may include generating snoops and collecting snoop responses from cores 1110A-C in accordance with a cache coherence protocol such as MESI, MOSI, MOESI, or MESIF. The uncore logic 1120 may include multiple caching agents 1112 (e.g., 8 caching agents in one embodiment), each assigned to manage a distinct subset of the shared cache.

The caching agents 1112 may act as a proxy between the IIO 1180 and the interconnect module 1150, which in one embodiment is a QuickPath Interconnect (QPI). Thus, the caching agents 1112 perform a gate keeper function for all messages that originate from the IIO 1180 and that are to be transmitted to remote sockets (e.g., processors 1100B-C). Similarly, the caching agents 1112 may act as a proxy for messages originating in the remote sockets and associated with a cache line that is owned by an I/O device that IIO 1180 communicates with.

Integrated input/output cluster (IIO) 1180 is an I/O controller that is included in processor 1100A. In alternative embodiments an external input/output controller (e.g., an I/O controller hub, which may be a component of a southbridge integrated circuit) may be used rather than IIO 1180. IIO 1180 (or other I/O controller) connects to and controls I/O devices. For example, IIO 1180 may connect to I/O devices via PCI, PCI express (PCIe), PCI extended (PCI-X), or other buses 1185A-C. The I/O devices may be, for example, network adapters, graphics cards, audio cards, SCSI controllers, cluster interconnects, hard drive controllers, disk drives, and so forth.

Home agent 1155 controls coherent access to, and otherwise manages, a subset of a system memory 1160. Home agents are responsible for ensuring that a most recent version of data is returned to a requestor either from memory or a cache. The home agents are also responsible for invalidating cache lines associated with caching agents responsive to requests for exclusive access to the data. For example, home agent 1155 may perform various processing for requests directed to a portion of system memory 1160 coupled to processors 1100A-C. This region of system memory (e.g., a range of memory addresses and/or cache lines) may, for example, correspond to one or more dual in-line memory modules (DIMMs). More specifically, home agent 1155 may receive incoming requests that are directed to this region of memory and, via logic present in the home agent 1155, resolve conflicts and maintain ordering of transactions among other operations. Accordingly, home agent 1155 may include logic to receive requests from various components or agents (e.g., caching agents 1112 from any of processors 1100A-C) and route these requests as appropriate to the corresponding region of memory via integrated memory controller (iMC) 1140 (or through an external memory controller).

Integrated memory controller 1140 is the interface between system memory (e.g., DRAM) 1160 and the home agent 1155. Accordingly, integrated memory controller 1140 translates read and write commands into specific memory commands and schedules them with respect to memory timing.

Note that each processor 1100A, 1100B, 1100C may include its own home agent, and each home agent may be responsible for managing a different region of shared memory 1160. Each processor 1100A, 1100B, 1100C may additionally be a multi-core processor that includes an uncore logic such as uncore logic 1120. Accordingly, each processor 1100A-400C may be connected to different I/O devices, and may manage a different region of system memory 1160. The home agents of the processors 1100A-C may use a cache coherency protocol such as MESIF, MESI, etc. to maintain coherent caches of system memory 1160.

Figure 12:
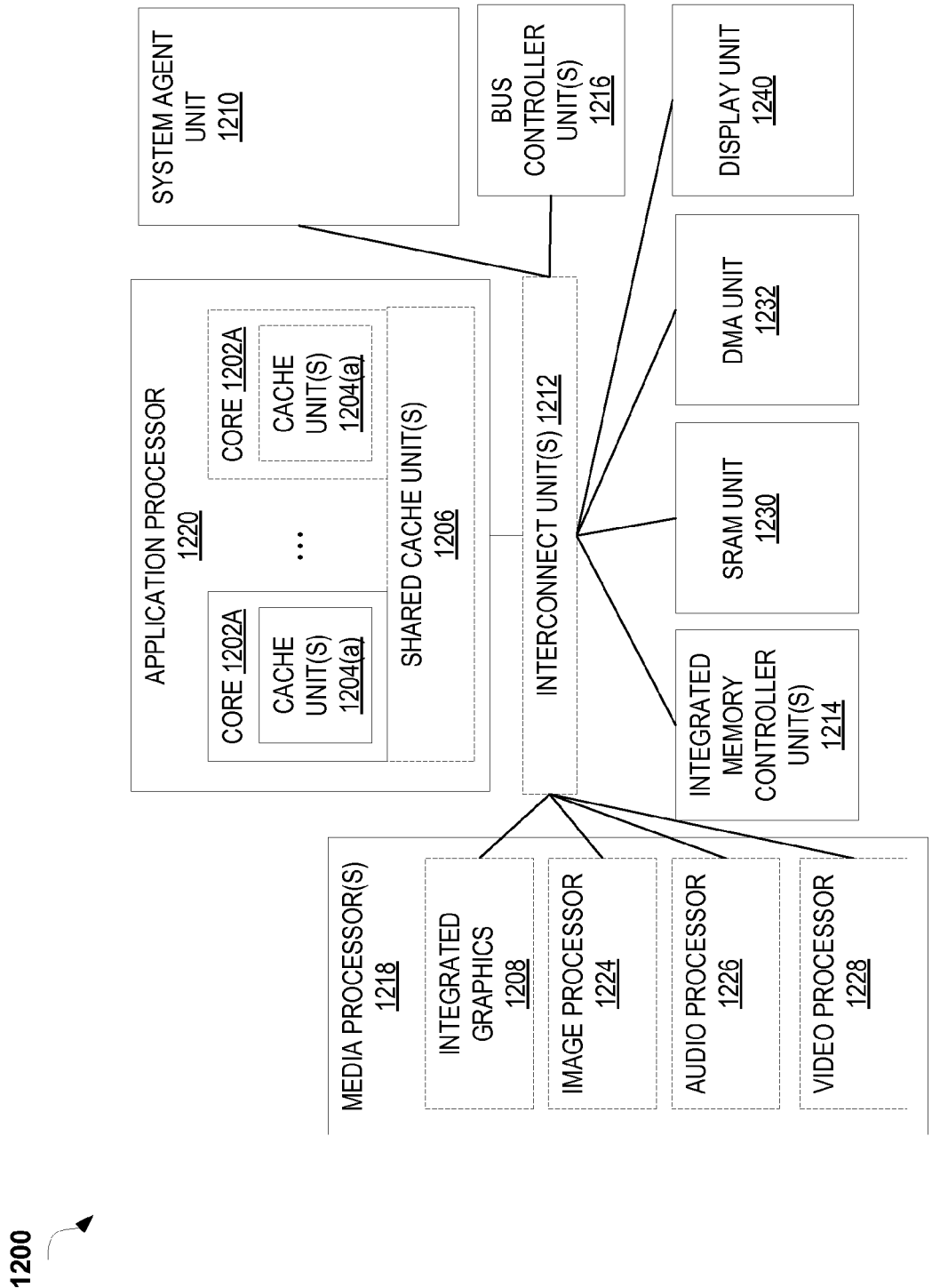
FIG. 12 is a block diagram of a system on chip (SoC) in accordance with an embodiment of the present disclosure.

Embodiments may be implemented in many different system types. FIG. 12 is a block diagram of a SoC 1200 in accordance with an embodiment of the present disclosure. Dashed lined boxes are optional features on more advanced SoCs. In FIG. 12, an interconnect unit(s) 1212 is coupled to: an application processor 1220 which includes a set of one or more cores 1202A-N and shared cache unit(s) 1206; a system agent unit 1210; a bus controller unit(s) 1216; an integrated memory controller unit(s) 1214; a set or one or more media processors 1218 which may include integrated graphics logic 1208, an image processor 1224 for providing still and/or video camera functionality, an audio processor 1226 for providing hardware audio acceleration, and a video processor 1228 for providing video encode/decode acceleration; an static random access memory (SRAM) unit 1230; a direct memory access (DMA) unit 1232; and a display unit 1240 for coupling to one or more external displays. In one embodiment, a memory module may be included in the integrated memory controller unit(s) 1214. In another embodiment, the memory module may be included in one or more other components of the SoC 1200 that may be used to access and/or control a memory. The application processor 1220 may include a microcode context and aliased parameter passing logic as described in embodiments herein.

The memory hierarchy includes one or more levels of cache within the cores, a set or one or more shared cache units 1206, and external memory (not shown) coupled to the set of integrated memory controller units 1214. The set of shared cache units 1206 may include one or more mid-level caches, such as level 2 (L2), level 3 (L3), level 4 (L4), or other levels of cache, a last level cache (LLC), and/or combinations thereof.

In some embodiments, one or more of the cores 1202A-N are capable of multi-threading.

The system agent 1210 includes those components coordinating and operating cores 1202A-N. The system agent unit 1210 may include for example a power control unit (PCU) and a display unit. The PCU may be or include logic and components needed for regulating the power state of the cores 1202A-N and the integrated graphics logic 1208. The display unit is for driving one or more externally connected displays.

The cores 1202A-N may be homogenous or heterogeneous in terms of architecture and/or instruction set. For example, some of the cores 1202A-N may be in order while others are out-of-order. As another example, two or more of the cores 1202A-N may be capable of execution the same instruction set, while others may be capable of executing only a subset of that instruction set or a different instruction set.

The application processor 1220 may be a general-purpose processor, such as a Core™ i3, i5, i7, 2 Duo and Quad, Xeon™, Itanium™, XScale™ or StrongARM™ processor, which are available from Intel™ Corporation, of Santa Clara, Calif. Alternatively, the application processor 1220 may be from another company, such as ARM Holdings™, Ltd, MIPS™, etc. The application processor 1220 may be a special-purpose processor, such as, for example, a network or communication processor, compression engine, graphics processor, co-processor, embedded processor, or the like. The application processor 1220 may be implemented on one or more chips. The application processor 1220 may be a part of and/or may be implemented on one or more substrates using any of a number of process technologies, such as, for example, BiCMOS, CMOS, or NMOS.

Figure 13:
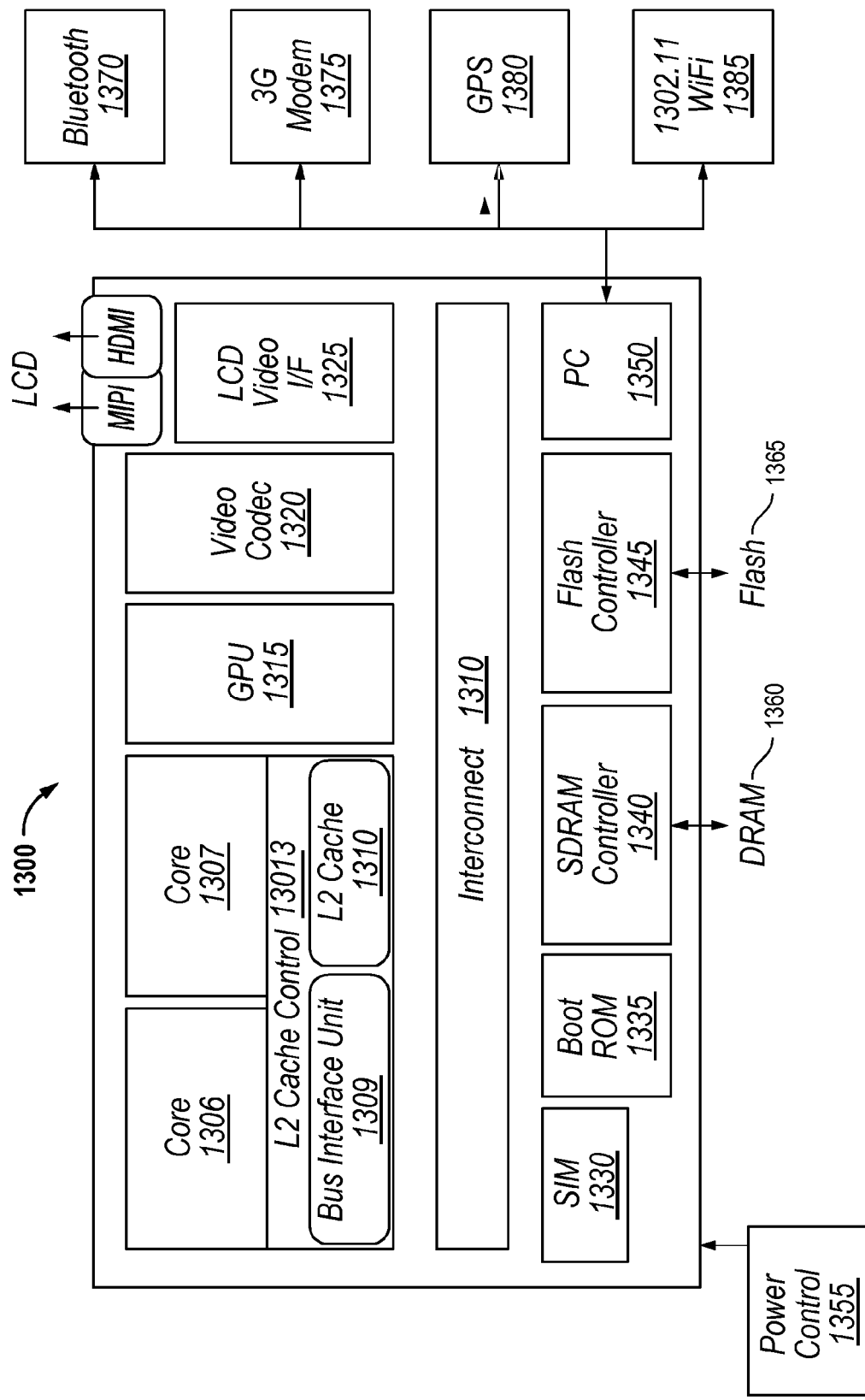
FIG. 13 is a block diagram of an embodiment of a system on-chip (SOC) design.

FIG. 13 is a block diagram of an embodiment of a system on-chip (SoC) design in accordance with the present disclosure. As a specific illustrative example, SoC 1300 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 1300 includes 2 cores—1306 and 1307. Cores 1306 and 1307 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1306 and 1307 are coupled to cache control 1308 that is associated with bus interface unit 1309 and L2 cache 1310 to communicate with other parts of system 1300. Interconnect 1310 includes an on-chip interconnect, such as an IOSF, AMBA, or other interconnect discussed above, which potentially implements one or more aspects of the described disclosure. In one embodiment, a microcode context and aliased parameter passing logic may be included in cores 1306, 1307.

Interconnect 1310 provides communication channels to the other components, such as a Subscriber Identity Module (SIM) 1330 to interface with a SIM card, a boot ROM 1335 to hold boot code for execution by cores 1306 and 1307 to initialize and boot SoC 1300, a SDRAM controller 1340 to interface with external memory (e.g. DRAM 1360), a flash controller 1345 to interface with non-volatile memory (e.g. Flash 1365), a peripheral control 1350 (e.g. Serial Peripheral Interface) to interface with peripherals, video codecs 1320 and Video interface 1325 to display and receive input (e.g. touch enabled input), GPU 1315 to perform graphics related computations, etc. Any of these interfaces may incorporate aspects of the disclosure described herein. In addition, the system 1300 illustrates peripherals for communication, such as a Bluetooth module 1370, 3G modem 1375, GPS 1380, and Wi-Fi 1385.

Figure 14:
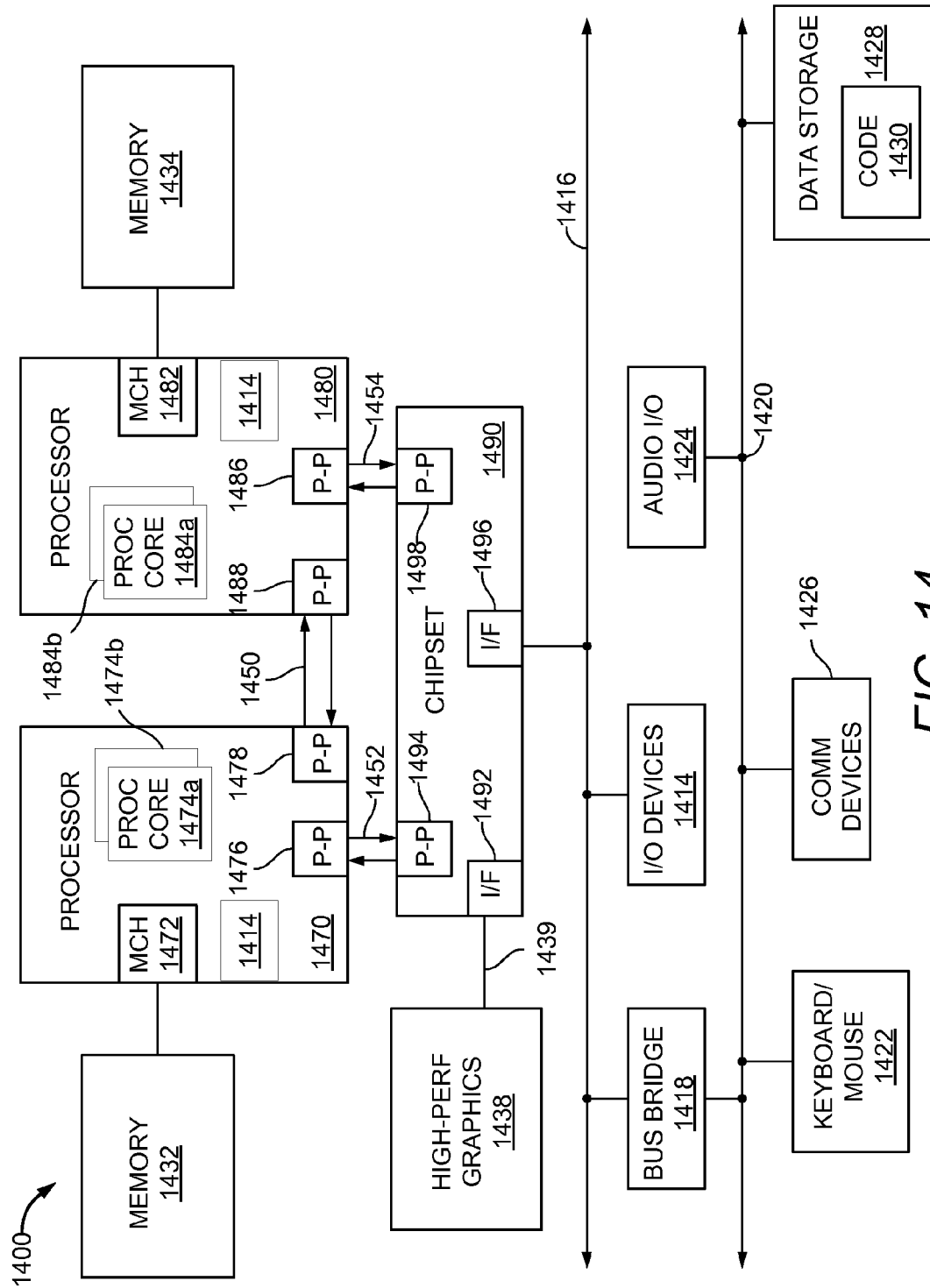
FIG. 14 is a block diagram of a computing device in accordance with an embodiment of the present invention.

Referring now to FIG. 14, shown is a block diagram of a system in accordance with an embodiment of the present invention. As shown in FIG. 14, multiprocessor system 1400 is a point-to-point interconnect system, and includes a first processor 1470 and a second processor 1480 coupled via a point-to-point interconnect 1450. One or both of the first processor 1470 and the second processor 1480 may include a microcode context and aliased parameter passing logic 114, which may correspond to similarly named components in the preceding figures. As shown in FIG. 14, each of processors 1470 and 1480 may be multicore processors, including first and second processor cores (i.e., processor cores 1474*a* and 1474*b* and processor cores 1484*a* and 1484*b*), although potentially many more cores may be present in the processors.

Still referring to FIG. 14, first processor 1470 further includes a memory controller hub (MCH) 1472 (e.g., an integrated memory controller) and point-to-point (P-P) interfaces 1476 and 1478. Similarly, second processor 1480 includes a MCH 1482 and P-P interfaces 1486 and 1488. MCH's 1472 and 1482 couple the processors to respective memories, namely a memory 1432 and a memory 1434, which may be portions of main memory (e.g., a dynamic random access memory (DRAM)) locally attached to the respective processors, and which collectively may maintain a directory. First processor 1470 and second processor 1480 may be coupled to chipset 1490 via P-P interconnects 1452 and 1454, respectively.

Chipset 1490 includes P-P interfaces 1494 and 1498. Furthermore, chipset 1490 includes an interface 1492 to couple chipset 1490 with a high performance graphics engine 1438, by a P-P interconnect 1439. In turn, chipset 1490 may be coupled to a first bus 1416 via an interface 1496. Various input/output (I/O) devices 1414 (also referred to as I/O devices) may be coupled to first bus 1416, along with a bus bridge 1418 which couples first bus 1416 to a second bus 1420. Various devices may be coupled to second bus 1420 including, for example, a keyboard/mouse 1422, communication devices 1426 and a data storage unit 1428 such as a disk drive or other mass storage device which may include code 1430, in one embodiment. Further, an audio I/O 1424 may be coupled to second bus 1420.

Figure 15:
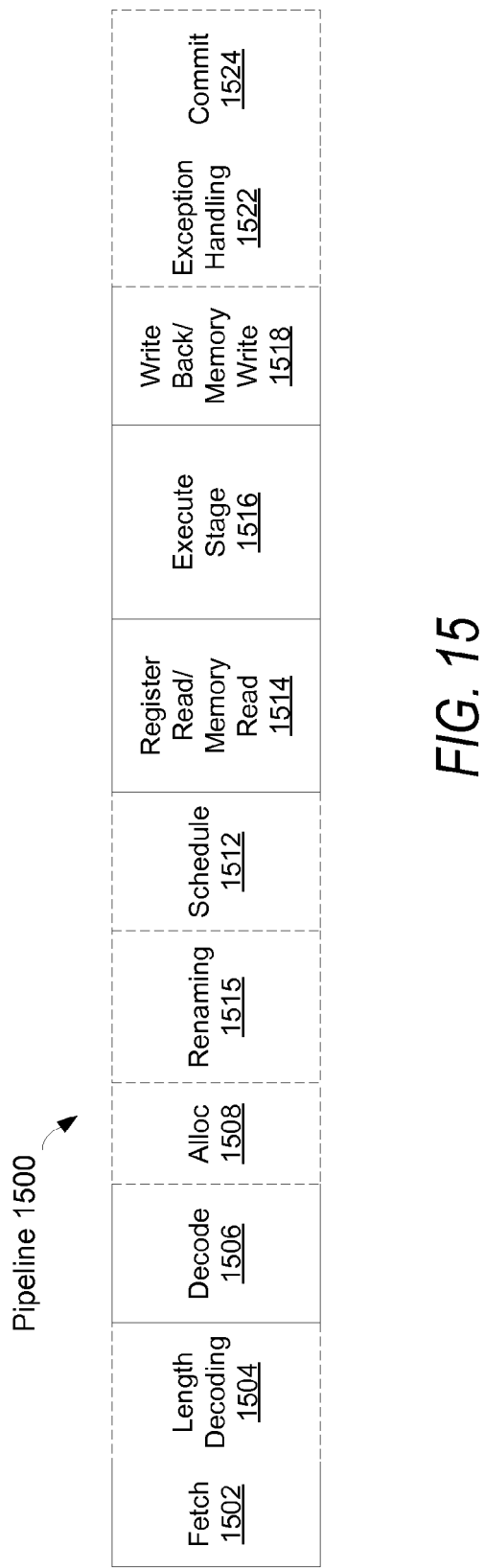
FIG. 15 is a block diagram illustrating an in-order pipeline and a register renaming stage, out-of-order issue/execution pipeline implemented by a processor core.
Figure 16:
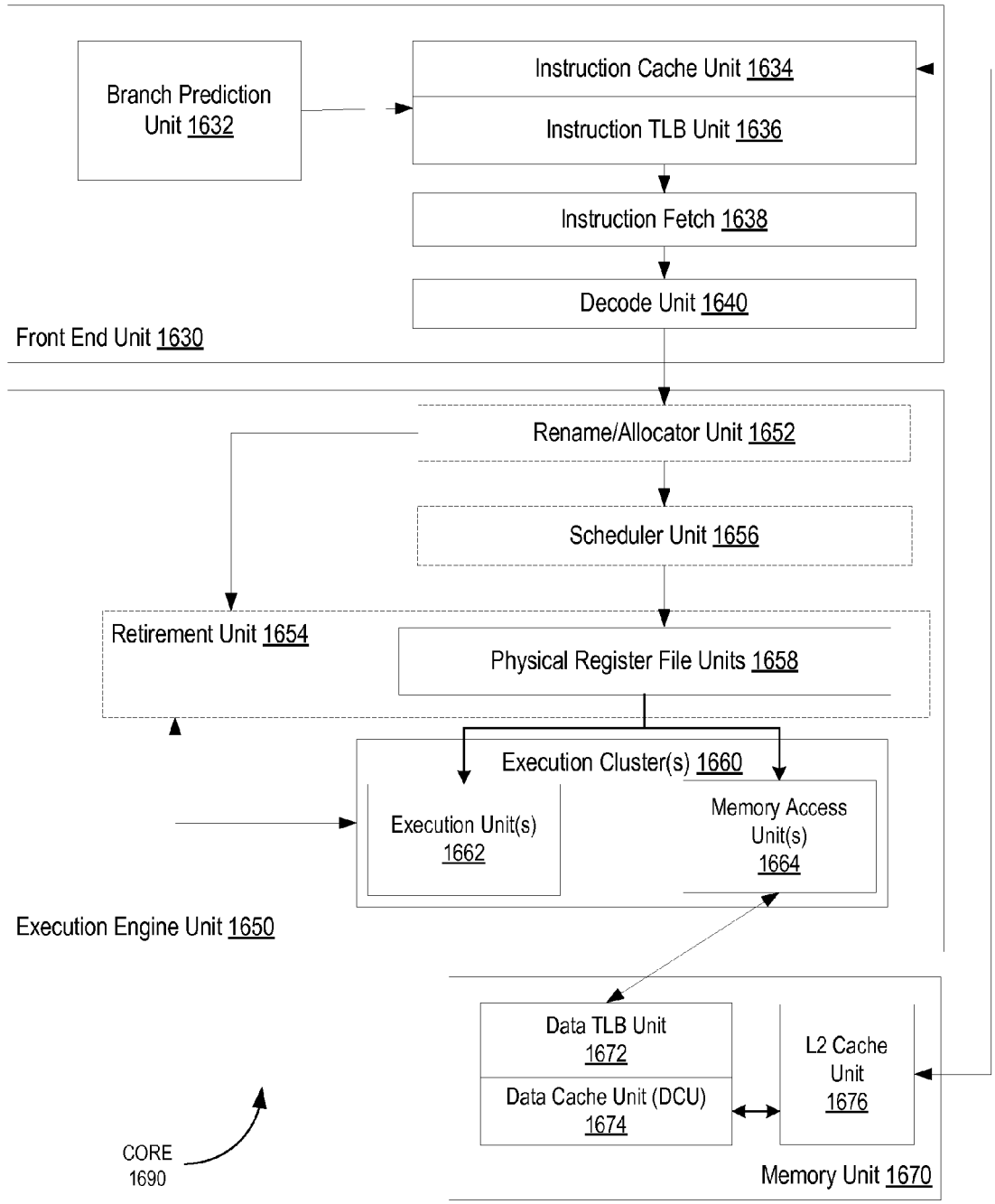
FIG. 16 is a block diagram illustrating an in-order architecture core and a register renaming logic, out-of-order issue/execution logic to be included in a processor according to at least one embodiment of the disclosure.

FIG. 15 is a block diagram illustrating an in-order pipeline and a register renaming stage, out-of-order issue/execution pipeline implemented by core 1690 of FIG. 16 (which may be include in a processor). FIG. 16 is a block diagram illustrating an in-order architecture core and a register renaming logic, out-of-order issue/execution logic that may be included in a processor according to at least one embodiment of the invention. The solid lined boxes in FIG. 15 illustrate the in-order pipeline, while the dashed lined boxes illustrates the register renaming, out-of-order issue/execution pipeline. Similarly, the solid lined boxes in FIG. 15 illustrate the in-order architecture logic, while the dashed lined boxes illustrates the register renaming logic and out-of-order issue/execution logic. In FIG. 15, a processor pipeline 1500 includes a fetch stage 1502, a length decode stage 1504, a decode stage 1506, an allocation stage 1508, a renaming stage 1510, a scheduling (also known as a dispatch or issue) stage 1512, a register read/memory read stage 1510, an execute stage 1516, a write back/memory write stage 1518, an exception handling stage 1522, and a commit stage 1024. In one embodiment, a microcode context and aliased parameter passing logic (as described in embodiments herein) may be used by processing core 1690 (e.g., at one or more of the register read/memory read stage 1514 and the write back/memory write stage 1518).

FIG. 16 is a block diagram illustrating an in-order architecture core and a register renaming logic, out-of-order issue/execution logic that may be included in a processor according to at least one embodiment of the disclosure. In FIG. 16, arrows denote a coupling between two or more units and the direction of the arrow indicates a direction of data flow between those units. FIG. 16 shows processor core 1690 including a front end unit 1630 coupled to an execution engine unit 1650, and both are coupled to a memory unit 1670.

The core 1690 may be a reduced instruction set computing (RISC) core, a complex instruction set computing (CISC) core, a very long instruction word (VLIW) core, or a hybrid or alternative core type. As yet another option, the core 1690 may be a special-purpose core, such as, for example, a network or communication core, compression engine, graphics core, or the like.

The front end unit 1630 includes a branch prediction unit 1632 coupled to an instruction cache unit 1634, which is coupled to an instruction translation lookaside buffer (TLB) 1636, which is coupled to an instruction fetch unit 1638, which is coupled to a decode unit 1640. The decode unit or decoder may decode instructions, and generate as an output one or more micro-operations, micro-code entry points, microinstructions, other instructions, or other control signals, which are decoded from, or which otherwise reflect, or are derived from, the original instructions. The decoder may be implemented using various different mechanisms. Examples of suitable mechanisms include, but are not limited to, lookup tables, hardware implementations, programmable logic arrays (PLAs), microcode read only memories (ROMs), etc. The instruction cache unit 1634 is further coupled to a level 2 (L2) cache unit 1676 in the memory unit 1670. The decode unit 1640 is coupled to a rename/allocator unit 1652 in the execution engine unit 1650.

The execution engine unit 1650 includes the rename/allocator unit 1652 coupled to a retirement unit 1654 and a set of one or more scheduler unit(s) 1656. The scheduler unit(s) 1656 represents any number of different schedulers, including reservations stations, central instruction window, etc. The scheduler unit(s) 1656 is coupled to the physical register file(s) unit(s) 1658. Each of the physical register file(s) units 1658 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 1658 is overlapped by the retirement unit 1654 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.). Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 1654 and the physical register file(s) unit(s) 1658 are coupled to the execution cluster(s) 1660. The execution cluster(s) 1660 includes a set of one or more execution units 162 and a set of one or more memory access units 1664. The execution units 1662 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1656, physical register file(s) unit(s) 1658, and execution cluster(s) 1660 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1664). It should also be understood that where separate pipelines are used, one or more of these pipelines may be out-of-order issue/execution and the rest in-order. In one embodiment, a memory module may be included in the memory access unit(s) 1664 of the core 1690. In another embodiment, the memory module may be included in one or more other components of the core 1690 that may be used to access and/or control a memory.

The set of memory access units 1664 is coupled to the memory unit 1670, which includes a data TLB unit 1672 coupled to a data cache unit 1674 coupled to a level 2 (L2) cache unit 1676. In one exemplary embodiment, the memory access units 1664 may include a load unit, a store address unit, and a store data unit, each of which is coupled to the data TLB unit 1672 in the memory unit 1670. The L2 cache unit 1676 is coupled to one or more other levels of cache and eventually to a main memory.

By way of example, the exemplary register renaming, out-of-order issue/execution core architecture may implement the pipeline 1500 as follows: 1) the instruction fetch 1638 performs the fetch and length decoding stages 1502 and 1504; 2) the decode unit 1640 performs the decode stage 1506; 3) the rename/allocator unit 1652 performs the allocation stage 1008 and renaming stage 1510; 4) the scheduler unit(s) 1656 performs the schedule stage 1512; 5) the physical register file(s) unit(s) 1658 and the memory unit 1670 perform the register read/memory read stage 1510; the execution cluster 1660 perform the execute stage 1516; 6) the memory unit 1670 and the physical register file(s) unit(s) 1658 perform the write back/memory write stage 1018; 7) various units may be involved in the exception handling stage 1522; and 8) the retirement unit 1654 and the physical register file(s) unit(s) 1658 perform the commit stage 1524.

The core 1690 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units 1634, 1674 and a shared L2 cache unit 1676, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 17:
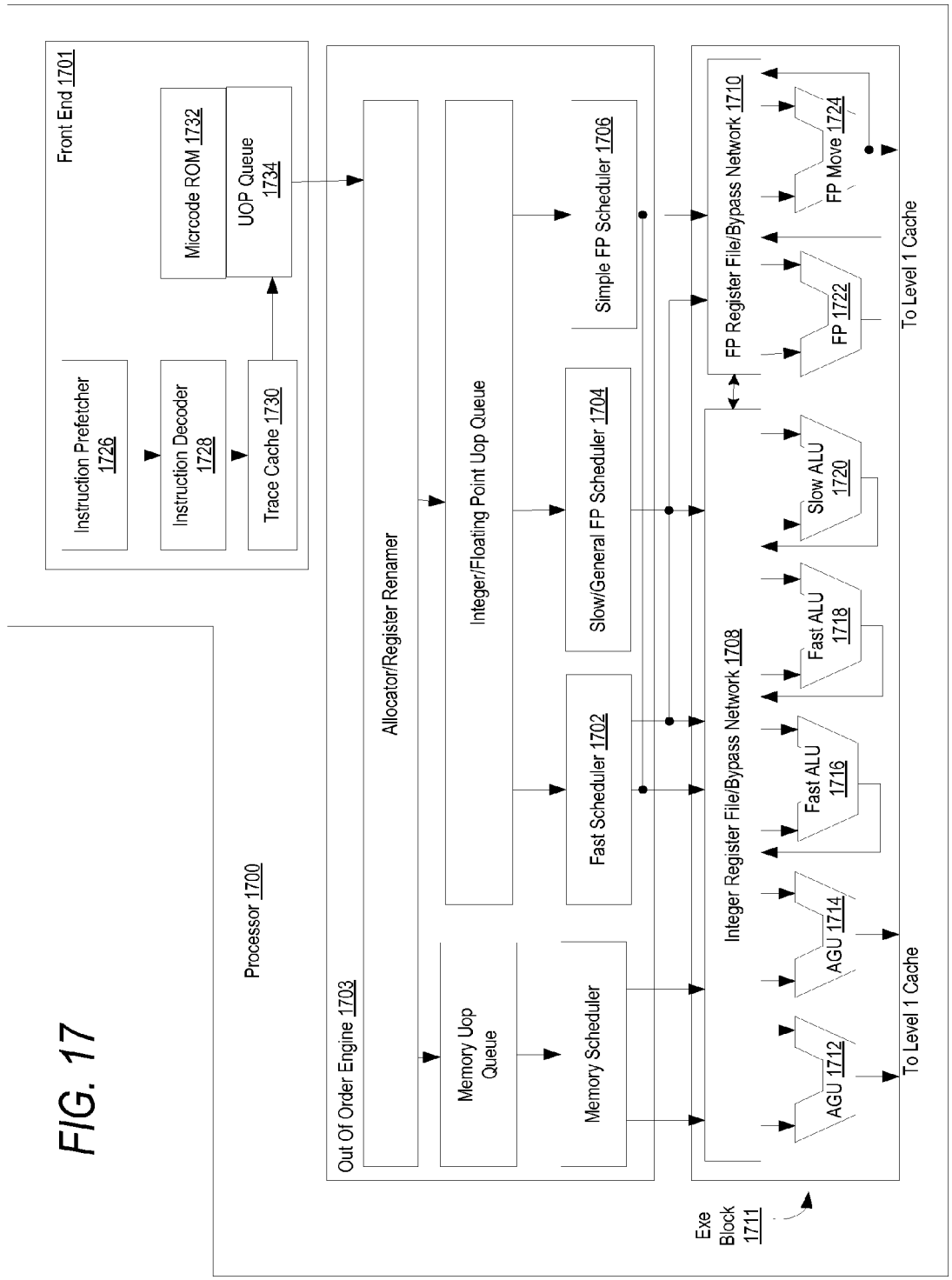
FIG. 17 is a block diagram of the micro-architecture for a processor that includes logic circuits to perform instructions in accordance with one embodiment of the present invention.

FIG. 17 is a block diagram of the micro-architecture for a processor 1700 that includes logic circuits to perform instructions in accordance with one embodiment of the present invention. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 1701 is the part of the processor 1700 that fetches instructions to be executed and prepares them to be used later in the processor pipeline. The front end 1701 may include several units. In one embodiment, the instruction prefetcher 1726 fetches instructions from memory and feeds them to an instruction decoder 1728 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 1730 takes decoded uops and assembles them into program ordered sequences or traces in the uop queue 1734 for execution. When the trace cache 1730 encounters a complex instruction, the microcode ROM 1732 provides the uops needed to complete the operation.

Some instructions are converted into a single micro-op, whereas others need several micro-ops to complete the full operation. In one embodiment, if more than four micro-ops are needed to complete an instruction, the decoder 1728 accesses the microcode ROM 1732 to do the instruction. For one embodiment, an instruction can be decoded into a small number of micro ops for processing at the instruction decoder 1728. In another embodiment, an instruction can be stored within the microcode ROM 1732 should a number of micro-ops be needed to accomplish the operation. The trace cache 1730 refers to an entry point programmable logic array (PLA) to determine a correct micro-instruction pointer for reading the micro-code sequences to complete one or more instructions in accordance with one embodiment from the micro-code ROM 1732. After the microcode ROM 1732 finishes sequencing micro-ops for an instruction, the front end 1701 of the machine resumes fetching micro-ops from the trace cache 1730.

The out-of-order execution engine 1703 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 1702, slow/general floating point scheduler 1704, and simple floating point scheduler 1706. The uop schedulers 1702, 1704, 1706, determine when a uop is ready to execute based on the readiness of their dependent input register operand sources and the availability of the execution resources the uops need to complete their operation. The fast scheduler 1702 of one embodiment can schedule on each half of the main clock cycle while the other schedulers can only schedule once per main processor clock cycle. The schedulers arbitrate for the dispatch ports to schedule uops for execution. In one embodiment, front end 1701 includes a microcode context and aliased parameter passing logic. Alternatively, or additionally, other components of processor 1700 may include a microcode context and aliased parameter passing logic.

Register files 1708, 1710, sit between the schedulers 1702, 1704, 1706, and the execution units 1712, 1714, 1716, 1718, 1720, 1722, and 1724 in the execution block 1711. There is a separate register file 1708, 1710, for integer and floating point operations, respectively. Each register file 1708, 1710, of one embodiment also includes a bypass network that can bypass or forward just completed results that have not yet been written into the register file to new dependent uops. The integer register file 1708 and the floating point register file 1710 are also capable of communicating data with the other. For one embodiment, the integer register file 1708 is split into two separate register files, one register file for the low order 32 bits of data and a second register file for the high order 32 bits of data. The floating point register file 1710 of one embodiment has 178 bit wide entries because floating point instructions typically have operands from 64 to 128 bits in width.

The execution block 1711 contains the execution units 1712, 1714, 1716, 1718, 1720, 1722, 1724, where the instructions are actually executed. This section includes the register files 1708, 1710, that store the integer and floating point data operand values that the micro-instructions need to execute. The processor 1700 of one embodiment is comprised of a number of execution units: address generation unit (AGU) 1712, AGU 1714, fast ALU 1716, fast ALU 1718, slow ALU 1720, floating point ALU 1722, floating point move unit 1724. For one embodiment, the floating point execution blocks 1722, 1724, execute floating point, MMX, SIMD, and SSE, or other operations. The floating point ALU 1722 of one embodiment includes a 64 bit by 64 bit floating point divider to execute divide, square root, and remainder micro-ops. For embodiments of the present invention, instructions involving a floating point value may be handled with the floating point hardware. In one embodiment, the ALU operations go to the high-speed ALU execution units 1716, 1718. The fast ALUs 1716, 1718, of one embodiment can execute fast operations with an effective latency of half a clock cycle. For one embodiment, most complex integer operations go to the slow ALU 1720 as the slow ALU 1720 includes integer execution hardware for long latency type of operations, such as a multiplier, shifts, flag logic, and branch processing. Memory load/store operations are executed by the AGUs 1712, 1714. For one embodiment, the integer ALUs 1716, 1718, 1720, are described in the context of performing integer operations on 64 bit data operands. In alternative embodiments, the ALUs 1716, 1718, 1720, can be implemented to support a variety of data bits including 16, 32, 128, 256, etc. Similarly, the floating point units 1722, 1724, can be implemented to support a range of operands having bits of various widths. For one embodiment, the floating point units 1722, 1724, can operate on 128 bits wide packed data operands in conjunction with SIMD and multimedia instructions.

In one embodiment, the uops schedulers 1702, 1704, 1706, dispatch dependent operations before the parent load has finished executing. As uops are speculatively scheduled and executed in processor 1700, the processor 1700 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data. For the discussions below, the registers are understood to be data registers designed to hold packed data, such as 64 bits wide MMXTM registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Embodiments may be implemented in code and may be stored on a storage medium having stored thereon instructions which can be used to program a system to perform the instructions. The storage medium may include, but is not limited to, any type of non-transitory storage medium such as disk including floppy disks, optical disks, hard disks/magnetic disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

The following examples pertain to further embodiments. Example 1 is a processor having a microcode storage to store a first microcode subroutine and a microcode caller of the first microcode subroutine; a first microcode alias storage comprising a first plurality of microcode alias locations; a second microcode alias storage comprising a second plurality of microcode alias locations; and a first logic, coupled to the first microcode alias storage and to the second microcode alias storage, wherein the first logic is configured to select a first one of a) the first microcode alias storage for storage of a parameter location in one of the first plurality of microcode alias locations or b) the second microcode alias storage for storage of the parameter location in one of the second plurality of microcode alias locations.

In example 2, the first logic of the processor of example 1 is further configured to associate the selected one of the first microcode alias storage or the second microcode alias storage to a current context. Additionally, the processor further comprises a context determination logic configured to determine the current context for the first microcode subroutine, and determine, based on the current context, whether the parameter location is stored in one of the first plurality of microcode alias locations of the first microcode alias storage or in one of the second plurality of microcode alias locations of the second microcode alias storage.

In example 3, the processor of any one of examples 1-2 further comprises a parameter location determination logic configured to receive an indication of a particular microcode alias location from the first microcode subroutine, and determine, based on the indication, the location of the parameter stored in the particular microcode alias location of the determined microcode alias storage. In example 4, the processor of any one of examples 1-3 has microcode storage that is further to store a second microcode subroutine that is called based on operations of the first microcode subroutine. Additionally, in example 4 the first logic is further configured to select a second one of a) the first microcode alias storage for storage of a second parameter location in one of the first plurality of microcode alias locations or b) the second microcode alias storage for storage of the second parameter location in one of the second plurality of microcode alias locations.

In example 5, the processor of example 4 further comprises a context determination logic configured to determine, for the first microcode subroutine, a first context and the first microcode alias storage that stores the first parameter location in one of the first plurality of microcode alias locations, and determine, for the second microcode subroutine, a second context and the second microcode alias storage that stores the second parameter location in one of the second plurality of microcode alias locations. In example 6, the processor of example 4 has first logic that is configured to select the first context during operation of the first microcode subroutine, to select the second context during operation of the second microcode subroutine, and to return to the first context after completion of the second microcode subroutine.

In example 7, the location of the parameter comprises one of a location where source data is stored or a location where result data is to be stored. Example 7 may optionally extend the subject matter of any one of examples 1 through 6. In example 8, the first microcode alias storage comprises a first microcode alias register and the second microcode alias storage comprises a second microcode alias register. Example 8 may optionally extend the subject matter of any one of examples 1 through 7. In example 9, the location of the parameter comprises a location in a register. Example 9 may optionally extend the subject matter of any one of examples 1 through 8.

In example 10, the processor of any one of examples 1-9 further includes a first inheritance logic, coupled to an input of the second microcode alias storage, the first inheritance logic being configured to determine whether to inherit the first parameter location from the first microcode alias location of the first microcode alias storage. In example 11, the processor of any one of examples 1-10 further includes a destination storage and a save logic configured to save the first context and the first parameter location from the first microcode alias location to the destination storage, wherein the first context and first parameter may be restored from the save location. In example 12, the processor of any one of examples 1-11 further includes a third microcode alias storage comprising a third plurality of microcode alias locations, wherein the first logic is further configured to select a first one of a) the first microcode alias storage for storage of a parameter location in one of the first plurality of microcode alias locations, b) the second microcode alias storage for storage of the parameter location in one of the second plurality of microcode alias locations, or c) the third microcode alias storage for storage of the parameter location in one of the third plurality of microcode alias locations.

In example 13, a method comprises mapping, by a processor, a first parameter location to a first microcode alias location of a first microcode alias storage for use by a first microcode subroutine; and mapping, by the processor, a second parameter location to a second microcode alias location of a second microcode alias storage for use by a second microcode subroutine. In example 14, the method of example 13 further includes selecting a first context for the first microcode subroutine, the first context associated with the first microcode alias storage, selecting a second context for the second microcode subroutine, the second context associated with the second microcode alias storage, and returning to the first context after completion of the second microcode subroutine, wherein the second microcode subroutine is called based on operations of the first microcode subroutine. In example 15, the method of example 14 further includes saving the first context and the first parameter location to a destination storage; and responsive to a restore microinstruction specifying the destination storage, restoring the first parameter location to the first microcode alias location.

In example 16, the second microcode alias location of the second microcode alias storage inherits the first parameter location from the first microcode alias location of the first microcode alias storage, and the second parameter location matches the first parameter location. Example 16 may optionally extend the subject matter of any one of examples 13-15. In example 17, the methods of any one of examples 13-16 are performed by a means for performing the method. In example 18, the methods of any one of examples 13-17 are performed by a processor configured to perform any one of the methods.

In example 19, a system includes an interconnect and a processor coupled to the interconnect. The processor includes a microcode storage to store a first microcode subroutine and a microcode caller of the first microcode subroutine, a first microcode alias storage comprising a first plurality of microcode alias locations and a second microcode alias storage comprising a second plurality of microcode alias locations. The processor further includes a first logic, coupled to the first microcode alias storage and to the second microcode alias storage, wherein the first logic is configured to select a first one of a) the first microcode alias storage for storage of a parameter location in one of the first plurality of microcode alias locations or b) the second microcode alias storage for storage of the parameter location in one of the second plurality of microcode alias locations.

In example 20, the system of example 19 further includes a context determination logic configured to determine the current context for the first microcode subroutine and determine, based on the current context, whether the parameter location is stored in one of the first plurality of microcode alias locations of the first microcode alias storage or in one of the second plurality of microcode alias locations of the second microcode alias storage. Additionally the first logic is further configured to associate the selected one of the first microcode alias storage or the second microcode alias storage to a current context.

In example 21, the system of any one of examples 19-20 further includes a parameter location determination logic configured to receive an indication of a particular microcode alias location from the first microcode subroutine and determine, based on the indication, the location of the parameter stored in the particular microcode alias location of the determined microcode alias storage.

In example 22, the microcode storage is further to store a second microcode subroutine that is called based on operations of the first microcode subroutine and the first logic is further configured to select a second one of a) the first microcode alias storage for storage of a second parameter location in one of the first plurality of microcode alias locations or b) the second microcode alias storage for storage of the second parameter location in one of the second plurality of microcode alias locations. Example 22 may optionally extend the subject matter of any one of examples 19-22.

In example 23, the system of example 22 further includes a context determination logic configured to determine, for the first microcode subroutine, a first context and the first microcode alias storage that stores the first parameter location in one of the first plurality of microcode alias locations, and determine, for the second microcode subroutine, a second context and the second microcode alias storage that stores the second parameter location in one of the second plurality of microcode alias locations. In example 24, the system of any one of examples 22-23 further includes a first logic that is configured to select the first context during operation of the first microcode subroutine, to select the second context during operation of the second microcode subroutine, and to return to the first context after completion of the second microcode subroutine.

In example 25, the location of the parameter comprises one of a location where source data is stored or a location where result data is to be stored. Example 25 may optionally extend the subject matter of any one of examples 19-24. In example 26, the first microcode alias storage comprises a first microcode alias register and the second microcode alias storage comprises a second microcode alias register. Example 26 may optionally extend the subject matter of any one of examples 19-25.

All optional features of the apparatus described above may also be implemented with respect to the method or process described herein. Specifics in the examples may be used anywhere in one or more embodiments.

While a limited number of embodiments have been described, those skilled in the art will appreciate numerous modifications and variations therefrom. It is intended that the appended claims cover all such modifications and variations as fall within the true spirit and scope of this disclosure.

What is claimed is:
1. A processor comprising:
 a microcode storage to store a first microcode subroutine and a microcode caller of the first microcode subroutine;
 a first microcode alias storage comprising a first plurality of microcode alias locations;
 a second microcode alias storage comprising a second plurality of microcode alias locations;
 a first logic, coupled to the first microcode alias storage and to the second microcode alias storage, wherein the first logic is to:
  select a first one of a) the first microcode alias storage for storage of a first parameter location in one of the first plurality of microcode alias locations or b) the second microcode alias storage for storage of the first parameter location in one of the second plurality of microcode alias locations; and
 a first inheritance logic, coupled to an input of the second microcode alias storage, the first inheritance logic to determine whether to inherit the first parameter location from the first microcode alias location of the first microcode alias storage.

2. The processor of claim 1, wherein the first logic is further to associate the selected one of the first microcode alias storage or the second microcode alias storage to a current context, the processor further comprising:
 a context determination logic to:
  determine the current context for the first microcode subroutine; and
  determine, based on the current context, whether the first parameter location is stored in one of the first plurality of microcode alias locations of the first microcode alias storage or in one of the second plurality of microcode alias locations of the second microcode alias storage.

3. The processor of claim 1, further comprising:
a parameter location determination logic to:
receive an indication of a particular microcode alias location from the first microcode subroutine; and
determine, based on the indication, the first parameter location stored in the particular microcode alias location of the determined microcode alias storage.

4. The processor of claim 1, wherein:
the microcode storage is further to store a second microcode subroutine that is called based on operations of the first microcode subroutine; and
the first logic is further to select a second one of a) the first microcode alias storage for storage of a second parameter location in one of the first plurality of microcode alias locations or b) the second microcode alias storage for storage of the second parameter location in one of the second plurality of microcode alias locations.

5. The processor of claim 4, further comprising:
a context determination logic to:
determine, for the first microcode subroutine, a first context and the first microcode alias storage that stores the first parameter location in one of the first plurality of microcode alias locations; and
determine, for the second microcode subroutine, a second context and the second microcode alias storage that stores the second parameter location in one of the second plurality of microcode alias locations.

6. The processor of claim 5, wherein the first logic is to select the first context during operation of the first microcode subroutine, to select the second context during operation of the second microcode subroutine, and to return to the first context after completion of the second microcode subroutine.

7. The processor of claim 1, wherein the first parameter location comprises one of a location where source data is stored or a location where result data is to be stored.

8. The processor of claim 1, wherein the first microcode alias storage comprises a first microcode alias register and the second microcode alias storage comprises a second microcode alias register.

9. The processor of claim 1, wherein the first parameter location comprises a location in a register.

10. The processor of claim 5, further comprising:
a destination storage; and
a save logic to save the first context and the first parameter location from the first microcode alias location to the destination storage, wherein the first context and first parameter may be restored from the destination storage.

11. The processor of claim 1, further comprising:
a third microcode alias storage comprising a third plurality of microcode alias locations;
wherein the first logic is further to select a first one of a) the first microcode alias storage for storage of a second parameter location in one of the first plurality of microcode alias locations, b) the second microcode alias storage for storage of the second parameter location in one of the second plurality of microcode alias locations, or c) the third microcode alias storage for storage of the second parameter location in one of the third plurality of microcode alias locations.

12. A method comprising:
mapping, by a processor, a first parameter location to a first microcode alias location of a first microcode alias storage for use by a first microcode subroutine; and
mapping, by the processor, a second parameter location to a second microcode alias location of a second microcode alias storage for use by a second microcode subroutine, wherein the second microcode alias location of the second microcode alias storage inherits the first parameter location from the first microcode alias location of the first microcode alias storage, and wherein the second parameter location matches the first parameter location.

13. The method of claim 12, wherein the second microcode subroutine is called based on operations of the first microcode subroutine, the method further comprising:
selecting a first context for the first microcode subroutine, the first context associated with the first microcode alias storage;
selecting a second context for the second microcode subroutine, the second context associated with the second microcode alias storage; and
returning to the first context after completion of the second microcode subroutine.

14. The method of claim 13, further comprising:
saving the first context and the first parameter location to a destination storage; and
responsive to a restore microinstruction specifying the destination storage, restoring the first parameter location to the first microcode alias location.

15. A system comprising:
an interconnect; and
a processor coupled with the interconnect, the processor comprising:
a microcode storage to store a first microcode subroutine and a microcode caller of the first microcode subroutine;
a first microcode alias storage comprising a first plurality of microcode alias locations;
a second microcode alias storage comprising a second plurality of microcode alias locations; and
a first logic, coupled to the first microcode alias storage and to the second microcode alias storage, wherein the first logic is to:
select a first one of a) the first microcode alias storage for storage of a first parameter location in one of the first plurality of microcode alias locations or b) the second microcode alias storage for storage of the first parameter location in one of the second plurality of microcode alias locations; and
associate the selected one of the first microcode alias storage or the second microcode alias storage to a current context; and
a context determination logic to:
determine the current context for the first microcode subroutine; and
determine, based on the current context, whether the first parameter location is stored in one of the first plurality of microcode alias locations of the first microcode alias storage or in one of the second plurality of microcode alias locations of the second microcode alias storage.

16. The system of claim 15, the processor further comprising a parameter location determination logic configured to:
receive an indication of a particular microcode alias location from the first microcode subroutine; and
determine, based on the indication, the first parameter location stored in the particular microcode alias location of the determined microcode alias storage.

17. The system of claim 15, wherein the microcode storage is further to store a second microcode subroutine that is called based on operations of the first microcode subroutine, and the first logic is further to select a second one of a) the first microcode alias storage for storage of a second parameter location in one of the first plurality of microcode alias locations or b) the second microcode alias storage for storage of the second parameter location in one of the second plurality of microcode alias locations, wherein the context determination logic is further to:

determine, for the first microcode subroutine, a first context and the first microcode alias storage that stores the first parameter location in one of the first plurality of microcode alias locations, the first context corresponding to the current context; and determine, for the second microcode subroutine, a second context and the second microcode alias storage that stores the second parameter location in one of the second plurality of microcode alias locations.

18. The system of claim 17, wherein the first logic is to select the first context during operation of the first microcode subroutine, to select the second context during operation of the second microcode subroutine, and to return to the first context after completion of the second microcode subroutine.

19. The system of claim 17, the processor further comprising:

a destination storage; and a save logic to save the first context and the first parameter location from the first microcode alias location to the destination storage, wherein the first context and first parameter may be restored from the destination storage.

20. The system of claim 15, the processor further comprising:

an inheritance logic, coupled to an input of the second microcode alias storage, the inheritance logic to determine whether to inherit the first parameter location from the first microcode alias location of the first microcode alias storage.

\* \* \* \* \*